United States Patent
He

(10) Patent No.: US 12,153,440 B2
(45) Date of Patent: Nov. 26, 2024

(54) MAP BUILDING METHOD, SELF-MOVING DEVICE, AND AUTOMATIC WORKING SYSTEM

(71) Applicant: Positec Power Tools (Suzhou) Co., Ltd., Suzhou (CN)

(72) Inventor: Mingming He, Suzhou (CN)

(73) Assignee: Positec Power Tools (Suzhou) Co., LTD., Jiangsu (CN)

( * ) Notice: Subject to any disclaimer, the term of this patent is extended or adjusted under 35 U.S.C. 154(b) by 308 days.

(21) Appl. No.: 17/764,888

(22) PCT Filed: Sep. 29, 2020

(86) PCT No.: PCT/CN2020/118908
§ 371 (c)(1),
(2) Date: May 6, 2022

(87) PCT Pub. No.: WO2021/058032
PCT Pub. Date: Apr. 1, 2021

(65) Prior Publication Data
US 2022/0342426 A1 Oct. 27, 2022

(30) Foreign Application Priority Data
Sep. 29, 2019 (CN) .......................... 201910930354.9

(51) Int. Cl.
*G05D 1/00* (2024.01)
*A01D 34/00* (2006.01)
(Continued)

(52) U.S. Cl.
CPC ......... *G05D 1/0274* (2013.01); *A01D 34/008* (2013.01); *G05D 1/0219* (2013.01);
(Continued)

(58) Field of Classification Search
CPC .................................................. G05D 1/0088
See application file for complete search history.

(56) References Cited

U.S. PATENT DOCUMENTS 9,818,303 B2 * 11/2017 Kotecha ............... G08G 5/0026
10,349,242 B2 * 7/2019 Narasimhan ......... H04B 17/318
(Continued)

FOREIGN PATENT DOCUMENTS

CN 203609373 U 5/2014
CN 104854428 A 8/2015
(Continued)

OTHER PUBLICATIONS

First Office Action in CN application No. CN201910930354.9, dated Apr. 19, 2022.
(Continued)

*Primary Examiner* — Michael A Berns
(74) *Attorney, Agent, or Firm* — Lee & Hayes, P.C.

(57) ABSTRACT

A map establishing method includes: generating a working region map and an initial shadow section, the working region map being a map of a boundary, and the initial shadow section being a part of the boundary on which a positioning signal does not meet a quality requirement; generating an initial shadow region according to the initial shadow section; exploring the initial shadow region, and collecting positioning signal quality data and positioning coordinates during exploration; and generating a corrected shadow region according to the positioning signal quality data and the positioning coordinates. A self-moving device includes: a controller; a map generator; and an exploration assembly and a shadow region corrector. An automatic working system is provided with the self-moving device. An (Continued)

actual range of a shadow region is first explored, and then a corrected shadow region is obtained, so that a working region map can be updated.

19 Claims, 11 Drawing Sheets

(51) Int. Cl.
  *H04B 17/318* (2015.01)
  *A01D 101/00* (2006.01)
(52) U.S. Cl.
  CPC ......... *G05D 1/0278* (2013.01); *H04B 17/318* (2015.01); *A01D 2101/00* (2013.01)

(56) References Cited

U.S. PATENT DOCUMENTS

| | | | |
|---|---|---|---|
| 11,073,827 B2 * | 7/2021 | Ko | G05D 1/0219 |
| 11,442,448 B2 * | 9/2022 | He | G01C 25/00 |
| 2018/0079085 A1 * | 3/2018 | Nakata | G05D 1/024 |
| 2019/0041225 A1 * | 2/2019 | Winkle | H04W 48/16 |
| 2019/0163175 A1 | 5/2019 | Ko et al. | |
| 2019/0346848 A1 * | 11/2019 | Zhou | G05D 1/0268 |
| 2019/0369640 A1 | 12/2019 | He et al. | |
| 2022/0342426 A1 * | 10/2022 | He | H04B 17/318 |

FOREIGN PATENT DOCUMENTS

| | | |
|---|---|---|
| CN | 106155053 A | 11/2016 |
| CN | 107239074 A | 10/2017 |
| CN | 108226859 A | 6/2018 |
| CN | 108226964 A | 6/2018 |
| CN | 108226965 A | 6/2018 |
| CN | 108226972 A | 6/2018 |
| CN | 108227704 A | 6/2018 |
| CN | 108227705 A | 6/2018 |
| CN | 108228739 A | 6/2018 |
| CN | 108228741 A | 6/2018 |
| CN | 108267752 | 7/2018 |
| CN | 108267752 A | 7/2018 |
| CN | 108398944 A | 8/2018 |
| CN | 207799086 U | 8/2018 |
| EP | 3491906 A1 | 6/2019 |
| EP | 3557355 A1 | 10/2019 |
| EP | 3561627 A1 | 10/2019 |
| EP | 3557355 A4 | 7/2020 |
| EP | 3561627 A4 | 7/2020 |
| JP | 2007-175286 A | 7/2007 |
| KR | 1020190064253 A | 6/2019 |
| KR | 102070068 B1 | 3/2020 |
| WO | 2015094054 | 6/2015 |
| WO | 2016097891 | 6/2016 |
| WO | 2017167207 A1 | 10/2017 |
| WO | 2018108179 A1 | 6/2018 |
| WO | 2018108180 A1 | 6/2018 |

OTHER PUBLICATIONS

First search report in CN application No. CN201910930354.9, dated Apr. 19, 2022.
European search opinion in EP application No. EP20869776.3, dated Jul. 28, 2023.
Supplementary European search report in EP application No. EP20869776.3,dated Jul. 28, 2023.
Written Opinion in application No. PCT/CN2020/118908 , dated Jan. 5, 2021.

* cited by examiner

MAP BUILDING METHOD, SELF-MOVING DEVICE, AND AUTOMATIC WORKING SYSTEM

This application is a National Stage Application of International Application No. PCT/CN2020/118908, filed on Sep. 29, 2020, which claims benefit of and priority to Chinese Patent Application No. 201910930354.9, filed on Sep. 29, 2019, all of which are hereby incorporated by reference in their entirety for all purposes as if fully set forth herein.

BACKGROUND

Technical Field

The present disclosure, including embodiments of the disclosure, relates to a self-moving device, and in particular, to a map establishing method, a self-moving device adopting the map establishing method, an automatic working system, a computer-readable storage medium, a computer program product, and an electronic device.

Related Art

With the continuous progress of computer technologies and artificial intelligence technologies, an automatic walking device similar to an intelligent robot has started to gradually enter people's life. Companies such as Samsung and Electrolux all have developed fully-automatic vacuum cleaners and have put such vacuum cleaners on the market. Such a fully-automatic vacuum cleaner usually has a small volume, is integrated with an environmental sensor, a self-driving system, a vacuum cleaning system, a battery, and a charging system, and can autonomously cruise indoors without manual control. At low energy, the fully-automatic vacuum cleaner automatically returns to a charging station to be docked for charging, and then continues with cruising and vacuuming. In addition, companies such as Husqvarna have developed a similar smart lawn mower. The smart lawn mower can cut grass on a user's lawn automatically and can be charged automatically without intervention of the user. Because the automatic lawn mowing system does not require management after being set once, users are freed from tedious, time-consuming, and labor-consuming housework such as cleaning and lawn maintenance. Therefore, the automatic lawn mowing system becomes highly popular.

Trees, buildings, and obstacles often exist in working regions of existing automatic lawn mowers. Shadow regions with weak navigation signals are easily formed around these trees, buildings, and obstacles. Satellite navigation signals are usually easily blocked by the trees, the buildings, the obstacles, and the like, thereby weakening the navigation signals. For example, a smart lawn mower may not perform accurate positioning due to a weak GPS signal when working in the shadow region.

Therefore, it is necessary to properly process the shadow region, so as to improve the positioning accuracy.

SUMMARY

Aiming at the defects in the prior art, the embodiments of the present disclosure provide a map establishing method and a self-moving device adopting the map establishing method, to resolve a problem of low positioning accuracy caused by the self-moving device processing a shadow region.

Some embodiments of the present disclosure provide a map establishing method, including the following steps:
generating a working region map and an initial shadow section, the working region map being a map of a boundary, and the initial shadow section being a part of the boundary on which a positioning signal does not meet a quality requirement;
determining whether a length value of the initial shadow section meets a preset condition, if the length value of the initial shadow section meets the preset condition, starting a step of generating an initial shadow region according to the initial shadow section, or otherwise, re-establishing the map, the preset condition being that the length value of the initial shadow section is less than or equal to 60 times a moving speed value of a self-moving device working in a working region;
generating an initial shadow region according to the initial shadow section, the initial shadow region including an enlarged width from the initial shadow section to the working region;
exploring the initial shadow region, and collecting positioning signal quality data and positioning coordinates during exploration; and
generating a corrected shadow region according to the positioning signal quality data and the positioning coordinates, where the exploring the initial shadow region includes the following steps:
controlling a self-moving device to move toward the initial shadow region in the working region;
obtaining a positioning signal quality parameter during movement of the self-moving device; and
determining that the self-moving device is located in a shadow region according to a case that the obtained positioning signal quality parameter does not meet a set positioning signal quality threshold, where
after the generating a corrected shadow region according to the positioning signal quality data and the positioning coordinates, the method includes the following steps:
recognizing a feature of the corrected shadow region;
determining an entering direction in which a self-moving device enters the corrected shadow region according to the feature of the corrected shadow region; and making the self-moving device enter the corrected shadow region in the entering direction to perform working surface processing.

Some embodiments provide a map establishing method, including the following steps:
generating a working region map and an initial shadow section, the working region map being a map of a boundary, and the initial shadow section being a part of the boundary on which a positioning signal does not meet a quality requirement;
generating an initial shadow region according to the initial shadow section;
exploring the initial shadow region, and collecting positioning signal quality data and positioning coordinates during exploration; and
generating a corrected shadow region according to the positioning signal quality data and the positioning coordinates.

In some embodiments, the initial shadow region includes an enlarged width from the initial shadow section to a working region.

In some embodiments, before the step of generating an initial shadow region according to the initial shadow section, the method includes:

determining whether a length value of the initial shadow section meets a preset condition, if the length value of the initial shadow section meets the preset condition, starting the step of generating an initial shadow region according to the initial shadow section, or otherwise, re-establishing the map.

In some embodiments, the preset condition is that the length value of the initial shadow section is less than or equal to 60 times a moving speed value of a self-moving device working in a working region.

In some embodiments, the exploring the initial shadow region includes the following steps:
controlling a self-moving device to move toward the initial shadow region in a working region;
obtaining a positioning signal quality parameter during movement of the self-moving device; and
determining that the self-moving device is located in a shadow region according to a case that the obtained positioning signal quality parameter does not meet a set positioning signal quality threshold.

In some embodiments, the self-moving device is controlled to move toward the initial shadow region from different directions in the working region.

In some embodiments, before the controlling a self-moving device to move toward the initial shadow region in a working region, the method includes the following steps:
generating an exploration starting position according to a position of the initial shadow region, where the self-moving device performs exploration from the exploration starting position.

In some embodiments, the generating a corrected shadow region according to the positioning signal quality data and the positioning coordinates includes the following steps:
obtaining a coordinate point in which a positioning signal quality parameter does not meet the set positioning signal quality threshold during movement of the self-moving device in each direction;
recognizing a boundary point of the corrected shadow region in each direction according to the coordinate point; and
connecting boundary points determined in all directions, to form a boundary of the corrected shadow region.

In some embodiments, the exploring the initial shadow region includes the following steps:
performing path planning according to the working region map;
making the self-moving device move and/or work according to a planned path;
obtaining a positioning signal quality parameter during movement of the self-moving device; and
determining that the self-moving device is located in a shadow region according to a case that the obtained positioning signal quality parameter does not meet a set positioning signal quality threshold.

In some embodiments, the generating a corrected shadow region according to the positioning signal quality data and the positioning coordinates includes the following steps:
obtaining a coordinate point in which the positioning signal quality parameter does not meet the set positioning signal quality threshold when the self-moving device moves according to the planned path;
recognizing a boundary point of the corrected shadow region according to the coordinate point; and
connecting boundary points determined in the planned path, to form a boundary of the corrected shadow region.

In some embodiments, after the generating a corrected shadow region according to the positioning signal quality data and the positioning coordinates, the method includes the following steps:
recognizing a feature of the corrected shadow region;
determining an entering direction in which a self-moving device enters the corrected shadow region according to the feature of the corrected shadow region; and
making the self-moving device enter the corrected shadow region in the entering direction to perform working surface processing.

In some embodiments, the shadow region includes a first edge roughly extending in an extending direction of a working region boundary and close to the working region boundary, and the entering direction is a direction along a rough normal to the first edge.

In some embodiments, the shadow region includes a first edge roughly extending in an extending direction of a working region boundary and close to the working region boundary, and the entering direction is a direction roughly parallel to the first edge.

In some embodiments r, the entering direction is a direction roughly perpendicular to a longitudinal long-axis of the shadow region.

In some embodiments, the shadow region includes a first edge close to an obstacle and a second edge away from the obstacle, and the entering direction includes a direction along a rough normal to the first edge or the second edge or the entering direction is a direction that minimizes a distance between the first edge and the second edge.

In some embodiments, after the making the self-moving device enter the shadow region in the entering direction, the method includes:
making the self-moving device exit the shadow region in an exit direction opposite to the entering direction.

In some embodiments, the map establishing method includes:
presetting a time threshold in the shadow region; and
controlling the self-moving device to enter the shadow region and exit the shadow region, so that a sum of an entering time of entering the shadow region and an exit time of exiting the shadow region meets the time threshold.

Some embodiments provide a self-moving device, including
a housing;
a mover, configured to drive the housing to move;
a task executor, configured to perform a working task; and
a controller, electrically connected to the mover and the task executor, and configured to control the mover to drive the self-moving device to move and control the task executor to perform the working task, where
the self-moving device includes:
a map generator, configured to generate a working region map and an initial shadow section, and generate an initial shadow region according to the initial shadow section;
an exploration assembly, configured to explore the initial shadow region within a working region range and collect positioning signal quality data and positioning coordinates during exploration, to generate a corrected shadow region; and
a shadow region corrector, configured to generate the corrected shadow region according to the positioning signal quality data and the positioning coordinates.

In some embodiments, the controller controls the self-moving device to move toward the initial shadow region from different directions in a working region for exploration.

In some embodiments, the self-moving device includes:
an exploration starting position determining assembly, configured to generate an exploration starting position according to a position of the initial shadow region, where the controller controls the self-moving device to perform exploration from the exploration starting position.

In some embodiments, the controller is configured to recognize feature information of the shadow region, determine an entering direction in which the self-moving device enters the shadow region according to a feature of the shadow region, and make the self-moving device enter the shadow region in the entering direction.

In some embodiments, the shadow region includes a first edge roughly extending in an extending direction of a working region boundary and close to the working region boundary, and the entering direction is a direction along a rough normal to the first edge.

In some embodiments, the shadow region includes a first edge roughly extending in an extending direction of a working region boundary and close to the working region boundary, and the entering direction is a direction roughly parallel to the first edge.

In some embodiments, the entering direction is a direction roughly perpendicular to a longitudinal long-axis of the shadow region.

In some embodiments, the shadow region includes a first edge close to an obstacle and a second edge away from the obstacle, and the entering direction includes a direction along a rough normal to the first edge or the second edge or the entering direction is a direction that minimizes a distance between the first edge and the second edge.

In some embodiments, after making the self-moving device enter the shadow region in the entering direction, the controller makes the self-moving device exit the shadow region in an exit direction opposite to the entering direction.

In some embodiments, the self-moving device includes:
a time presetter, configured to preset a time threshold of the self-moving device in the shadow region, where
the controller controls the self-moving device to enter the shadow region and exit the shadow region, so that a sum of an entering time of entering the shadow region and an exit time of exiting the shadow region meets the time threshold.

Some embodiments provide an automatic working system, including:
the self-moving device according to any one of the foregoing, moving and working in a defined working region.

Some embodiments provide a computer-readable storage medium, storing a computer program, where the computer program instructions, when executed by a computing apparatus, are operable to perform the map establishing method according to any one of the foregoing.

Some embodiments provide a computer program product, where when instructions in the computer program product are executed by a processor, the map establishing method is implemented, Some embodiments provide an electronic device, including:
a memory, configured to store computer executable instructions; and
a processor, configured to execute the computer executable instructions stored in the memory, to perform the map establishing method according to any one of the foregoing.

Compared with the prior art, in the present disclosure, an actual range of a shadow region is first explored, and then a map is updated, so that the working efficiency of the self-moving device can be improved, a staying time of the self-moving device in the shadow region can be effectively controlled, a processing mode of the shadow region can be reasonably planned, and the positioning accuracy can be improved.

BRIEF DESCRIPTION OF THE DRAWINGS

The foregoing technical problems, technical solutions, and beneficial effects of the present disclosure may be described in detail by using the following specific embodiments that can implement the present disclosure, and are clearly obtained with reference to the description of the accompanying drawings.

Same numerals and symbols in the accompanying drawings and the specification are used for representing same or equivalent elements.

In the figures.

Figure 1:
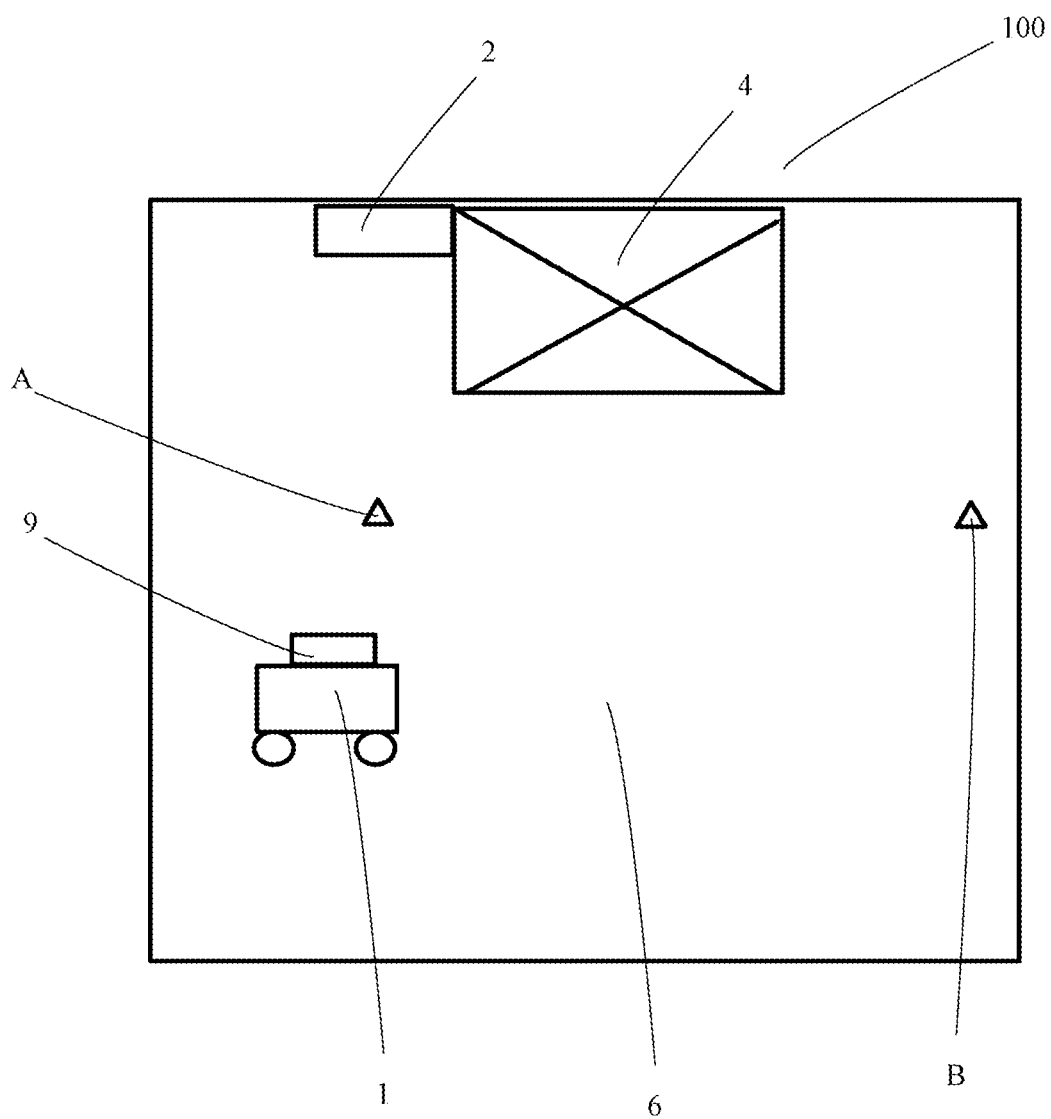
FIG. 1 is a schematic diagram of an automatic working system according to some embodiments.

| | | |
|---|---|---|
| 100. Automatic working system | 1. Automatic lawn mower | 2. Charging station |
| 3. Housing | 4. House | 5. Mover |
| 6. Lawn | 7. Task executor | 8. Boundary |
| 9. Mobile station | 30. Shadow region | 901. Mapping boundary |
| 902. Tree | 904. Assumption boundary | 905. Exploration boundary |
| 906. Actual boundary | 907. Island | 908. Initial position |
| 32. First edge | 34. Second edge | 110. Map generator |
| 120. Exploration assembly | 600. Electronic device | 610. Processor |
| 620. Memory | 630. Input apparatus | 640. Output apparatus |
| 130. Shadow region corrector. | | |

DETAILED DESCRIPTION

Detail description of the embodiments of the present disclosure will be made in the following, and examples thereof are illustrated in the accompanying drawings, throughout which identical or similar elements or elements of identical or similar functions are represented with identical or similar reference numerals. The embodiments that are described with reference to the accompanying drawings are exemplary, and are only used to interpret the present disclosure, instead limiting the present disclosure. On the contrary, the embodiments of the present disclosure include all changes, modifications, and equivalents falling within the spirit and protection scope of the appended claims.

FIG. 1 is a schematic diagram of an automatic working system 100 according to some embodiments. As shown in FIG. 1, the automatic working system 100 in these embodiments include a self-moving device. The self-moving device may move and work in a working region defined in a map. In these embodiments, the self-moving device is an automatic lawn mower 1. In some other embodiments, the self-moving device may alternatively be an unattended device including an automatic cleaning device, an automatic irrigation device, an automatic snowplow, or the like.

Figure 2:
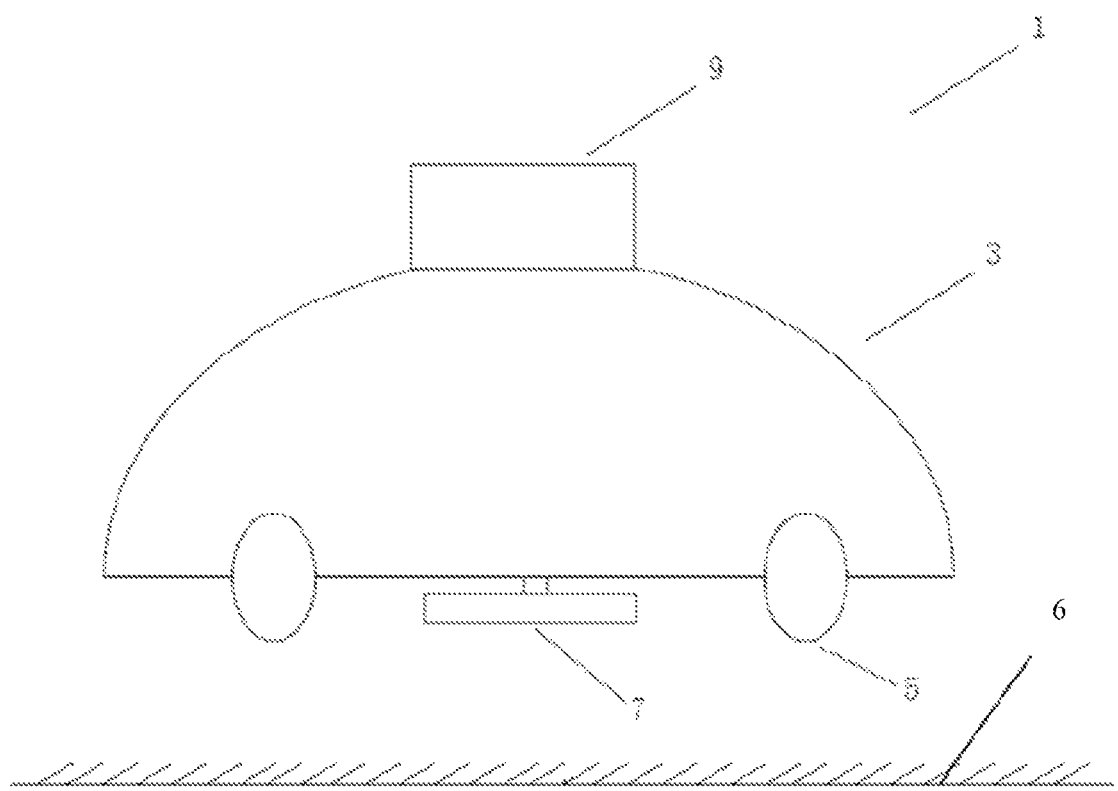
FIG. 2 is a schematic diagram in which a self-moving device works in a working region when being a smart lawn mower according to some embodiments.

As shown in FIG. 2, the automatic lawn mower 1 includes a housing 3, a mover 5, a task executor 7, an energy assembly, a controller, and the like. The automatic lawn mower 1 works in a lawn 6. The mover 5 includes a track or a wheel set, and is driven by a driving motor to drive the automatic lawn mower 1 to move. The task executor 7 includes a cutting assembly, mounted at the bottom of the housing 3 and driven by a cutting motor to rotate to perform mowing. The energy assembly includes a battery pack (not shown in the figure), which provides electric energy for movement and working of the automatic lawn mower 1. The controller is electrically connected to the mover 5, the task executor 7, and the energy assembly, controls the mover to drive the automatic lawn mower 1 to move, and controls the task executor to perform a working task.

Figure 3:
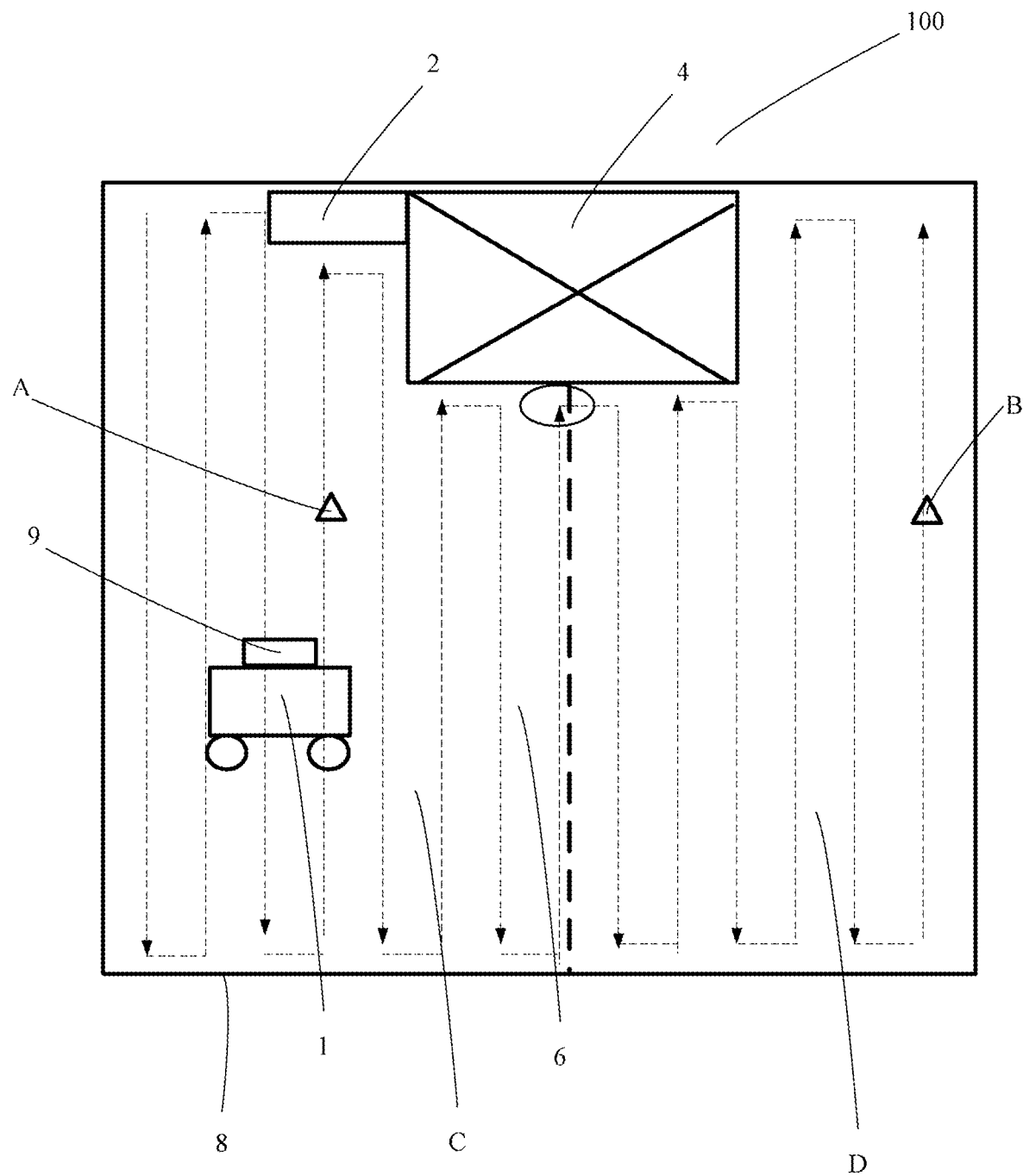
FIG. 3 is a schematic diagram in which an automatic working system includes two sub-working regions according to some embodiments.

As shown in FIG. 3, the automatic working system is configured to work in a predetermined working region. In some embodiments, the working region includes at least two separated sub-working regions, that is, a region C and a region D. A boundary 8 is formed between the working region and a non-working region, and there may be obstacles such as trees or pits in the working region.

As shown in FIG. 1, the automatic working system 100 includes a charging station 2, configured to supply electric energy to the automatic lawn mower 1. The charging station 2 may be arranged in an open place beside a house 4. The charging station 2 may alternatively be arranged in the working region or arranged on a boundary of the working region. In these embodiments t, the automatic working system 100 includes a navigator, configured to output a current position of the automatic lawn mower. Specifically, the navigator includes a mobile station 9.

As shown in FIG. 1 and FIG. 3, the automatic working system 100 includes a reference point A and a reference point B arranged in the working region. When the automatic lawn mower 1 performs calculation to obtain a position of the automatic lawn mower 1 during movement by using a satellite signal of a reference position obtained at a moment before the automatic lawn mower 1 departs as a reference positioning signal instead of using a real-time satellite signal of an entity base station, the reference point A, the reference point B, and the charging station 2 may be all used as reference positions. To improve the positioning accuracy of the automatic lawn mower 1, the reference position is an open position, and the satellite signal has relatively high quality.

The mobile station 9 is electrically connected to the controller, and is configured to store and process a satellite signal obtained by the automatic lawn mower 1, so that the automatic lawn mower 1 can move and work in the working region. In these embodiments, the mobile station 9 is configured to receive the satellite signal. The satellite signal includes a satellite angle, a clock, and the like. The satellite signal may be a GPS signal, or may be a Galileo signal or a Beidou signal, or may use several signals simultaneously. Specifically, in these embodiments, the satellite signal is a differential GPS (DGPS) signal, a GPS-RTK signal, or the like.

When outputting position information, the navigator may output an accuracy level of a positioning signal. The accuracy level of the positioning signal is a positioning signal quality parameter described below. The automatic lawn mower 1 may also determine a current positioning state according to the position information outputted by the navigator, and output a positioning state indication. Quality of the position information outputted by the navigator may be determined based on a quantity of satellites from which the navigator can receive signals, or the positioning state indication, or an accuracy factor, or a combination of a plurality of factors. An importance weight is set to obtain the quality of the position information. Error evaluation for the quality of the position information outputted by the navigator may be performed by the navigator itself, and the controller obtains an evaluation result, or the controller may perform error evaluation by using an output of the navigator, to obtain an evaluation result.

In these embodiments, the automatic lawn mower 1 includes at least one position sensor, electrically connected to the controller, and configured to detect a feature related to a position of the automatic lawn mower 1. The position sensor may include a camera, a radar, a capacitive sensor, an inertial navigation sensor, and the like. In these embodiments, the position sensor is the inertial navigation sensor. The inertial navigation sensor may include an accelerometer, an odometer, a compass, a gyroscope, a posture detection sensor, and the like, and is configured to detect a speed, an acceleration, a moving direction, and the like of the self-moving device. In these embodiments, when the quality of the position information outputted by the navigator does not meet a preset condition, the controller determines a current position of the automatic lawn mower 1 at least partially based on an output of the position sensor. Specifically, the position information outputted by the navigator and the output of the position sensor may be fused, to obtain the current position of the automatic lawn mower. The inertial navigation sensor is used as an example, if the inertial navigation sensor is continuously used for navigation, an error of an output of the inertial navigation sensor accumulates over time, resulting in a decrease in the accuracy of the outputted position information. Therefore, when the quality of the position information outputted by the navigator meets the preset condition, the output of the position sensor is corrected by using an output of a satellite navigation apparatus, so that the position sensor can maintain a high-precision output.

Therefore, in these embodiments, when the mobile station 9 works, navigation may be performed by using only a GPS positioning signal, or navigation may be performed by using a positioning signal obtained after a GPS positioning signal and inertial navigation data are fused, or navigation may be performed by using only inertial navigation data when a GPS signal is weak. The mobile station 9 may include an indicator (not shown in the figure), configured to output an indication indicating whether a differential GPS signal at a current position is good or not.

In these embodiments, the mobile station 9 may be detachably connected to the housing 3 of the automatic lawn mower 1. The mobile station 9 includes a first interface (not shown in the figure) connected to the housing of the automatic lawn mower 1. When the automatic lawn mower 1 works, the mobile station 9 is mounted on the housing 3 of the automatic lawn mower 1. When being connected to the housing 3 of the automatic lawn mower 1, the mobile station 9 may be electrically connected to the controller of the automatic lawn mower 1. The mobile station 9 outputs coordinates of a current position of the automatic lawn mower 1, and the controller controls movement and working of the automatic lawn mower 1 according to the current position of the automatic lawn mower 1. Alternatively, the mobile station outputs a control instruction to the controller according to coordinates of a current position. It should be noted that, in these embodiments, the mobile station 9 includes an independent power supply assembly (not shown in the figure). The mobile station 9 may works independently when being separated from the housing 3 of the automatic lawn mower 1. In some other embodiments, the mobile station 9 may be non-detachably connected to the housing 3 of the automatic lawn mower 1. If positioning is performed during working of the self-moving device, whether the mobile station 9 and the housing 3 of the automatic lawn mower 1 are detachable does not affect positioning.

In some embodiments, the mobile station 9 obtains error data by using a reference positioning signal before a current positioning signal, and obtains current position information based on processing of the error data and position information of the reference positioning signal, without using a satellite signal received in real time by a self-built base station or a shared base station at a current moment. Therefore, the self-built base station or the shared base station may be canceled, to simplify user mounting, thereby greatly reducing costs.

There may be some regions with weak satellite navigation signals in a working region, for example, a shadow region. When the automatic lawn mower moves in the regions, the navigation accuracy may be affected, and a navigation effect of the automatic lawn mower is affected.

To prevent the navigation accuracy from being reduced when the automatic lawn mower works in the shadow region, for example, the navigation accuracy of the automatic lawn mower may be assisted by using an inertial navigation system. However, an error of inertial navigation accumulates over time. To eliminate the accumulated error of the inertial navigation system and improve a positioning accuracy of the self-moving device, the accumulated error of the inertial navigation may be corrected by using positioning coordinates of a satellite navigation system after the inertial navigation system works for a period of time, to ensure the navigation accuracy of the self-moving device in the shadow region.

In these embodiments, a positioning apparatus of the self-moving device may be arranged in a server or may be arranged in the mobile station. This is not limited in these embodiments of this application.

The electronic device is, for example, a personal computer (PC), a cloud device, or a mobile device. The mobile device is, for example, a smartphone or a tablet computer.

It should be noted that, in these embodiments, an execution body may be, for example, a central processing unit (CPU) in a server or the electronic device on hardware, or may be, for example, a background management service in a server or the electronic device on software, which is not limited.

In some embodiments, an entity base station, that is, a self-built base station or a shared base station, is adopted. The self-built base station or the shared base station may provide a real-time satellite signal for positioning to the self-moving device as a reference positioning signal. In this positioning manner, the mobile station 9 performs calculation processing by using real-time satellite data obtained by the entity base station to obtain current position information without an accumulated error, and from the perspective of a satellite signal, it is considered that a positioning error is a constant value or an error difference is relatively small.

In some embodiments, a virtual base station is adopted, that is, any self-built base station or shared base station that can obtain a real-time satellite signal is not arranged, and only a satellite signal of a reference point obtained at a time point is used as a reference positioning signal for subsequent positioning. For example, a satellite signal obtained before the self-moving device departs is used as the reference positioning signal for subsequent positioning. Alternatively, in addition to using the satellite signal at the reference point position as the reference positioning signal, a satellite signal that meets a calculation condition before a current positioning signal may be used as the reference positioning signal. In this positioning manner, because a positioning error is an accumulated error, the error is gradually increased over time. That is, if positioning is only performed by using positioning navigation without using other positioning devices, it becomes increasingly inaccurate for the positioning over time. Therefore, the self-moving device sets error evaluation. When it is evaluated that an error exceeds a set error set threshold, the self-moving device is controlled to return to a reference point to re-obtain a satellite signal at a reference point position. The satellite signal is used as a new reference positioning signal for positioning.

For a shadow region, when the automatic lawn mower stays in the shadow region for a longer time, the positioning accuracy is worse. In addition, for a positioning manner without using the entity base station, the automatic lawn mower cannot implement effective positioning if time spent in the shadow region exceeds a specific time range. Therefore, a staying time of the automatic lawn mower in the shadow region may be controlled by effectively recognizing the shadow region, so that the staying time of the automatic lawn mower in the shadow region can be effectively controlled, and the positioning accuracy of the automatic lawn mower in the working region can be greatly improved.

Figure 4:
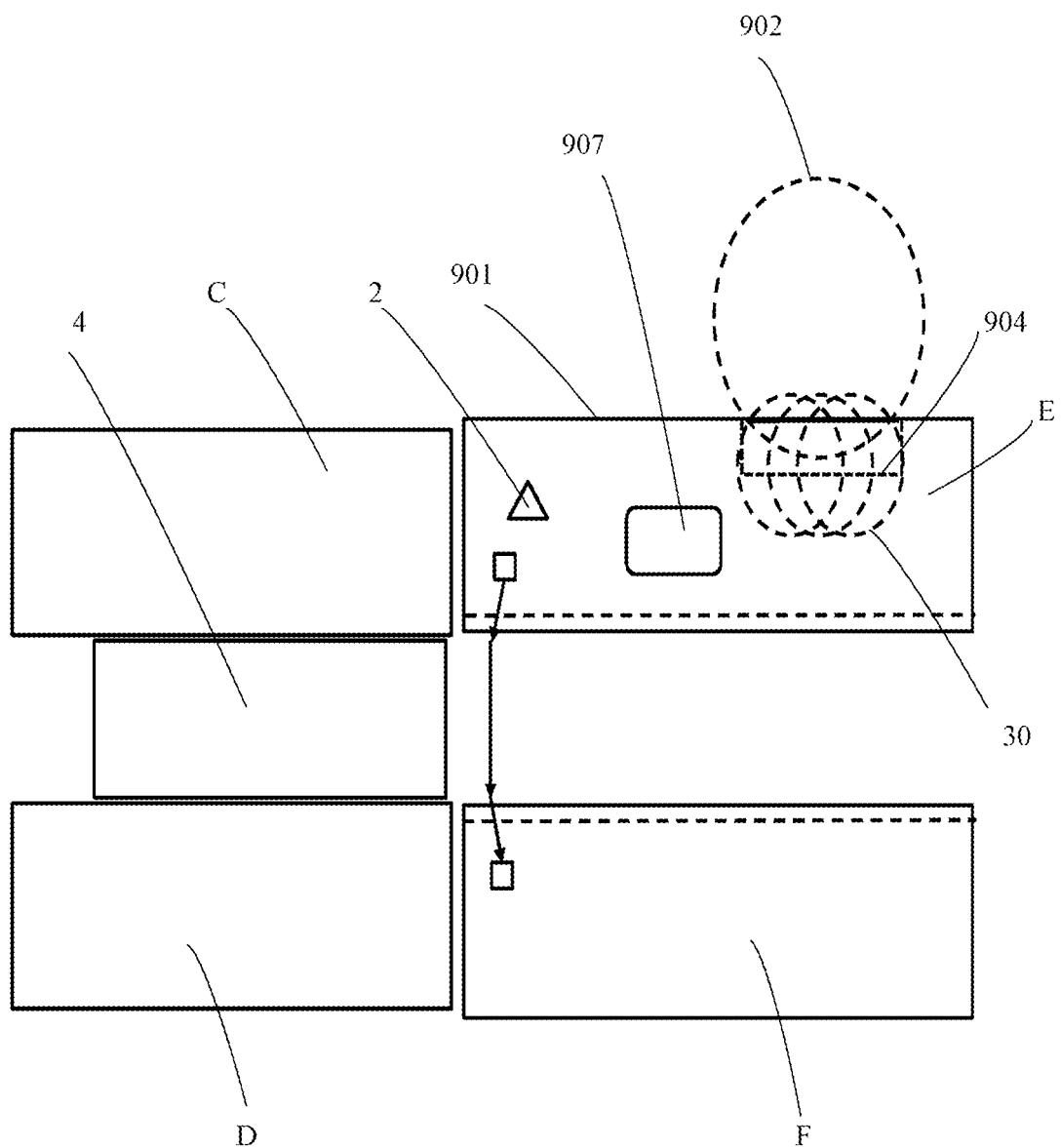
FIG. 4 is a schematic diagram in which there is a shadow region in a boundary when a self-moving device establishes a map.

As shown in FIG. 4, the automatic lawn mower 1 has a mapping boundary 901 obtained by mapping. There is an obstacle such as an island 907 in a working region. The working region is divided into four parts, which are respectively a region C, a region D, a region E, and a region F. A mapping manner may be that, for example, a user circles a working region of the self-moving device on Google Map, the mobile station 9 and the self-moving device are in integrated arrangement, and the self-moving device works around the working region by one circle. In some embodiments, if the self-moving device is an automatic lawn mower, the user may push the automatic lawn mower to work, the user may remotely control the automatic lawn mower to work, the automatic lawn mower may follow a track of a movement of the user, the automatic lawn mower may work automatically, or the like, which is not limited.

The mapping boundary 901 is a boundary on a map or a boundary obtained during walking. A working region map is generated by collecting basic position data of the working region. In some embodiments, the basic position data is obtained by using the navigator of the self-moving device through a manual operation. For example, the user holds a navigator (or a navigation device) to walk around an actual boundary of the working region by one circle, to obtain the basic position data. As shown in FIG. 4, when there is a tree 902 near the boundary, a shadow region 30 is formed. A satellite signal received in the shadow region is relatively weak during mapping, resulting in inaccurate positioning of this section of boundary in the mapping boundary 901, and this section of boundary with inaccurate positioning may be marked as an initial shadow region. In addition, to prevent the automatic lawn mower in a range of the section from moving beyond the boundary of the working region, the automatic lawn mower may be controlled to move toward the working region along an assumption boundary 904 of the shadow region. However, in this manner, if a shadow area is relatively large, it is easy to cause the automatic lawn mower to work in the shadow region for a long time, thereby affecting the positioning accuracy. Therefore, the shadow region needs to be first effectively recognized.

Figure 5:
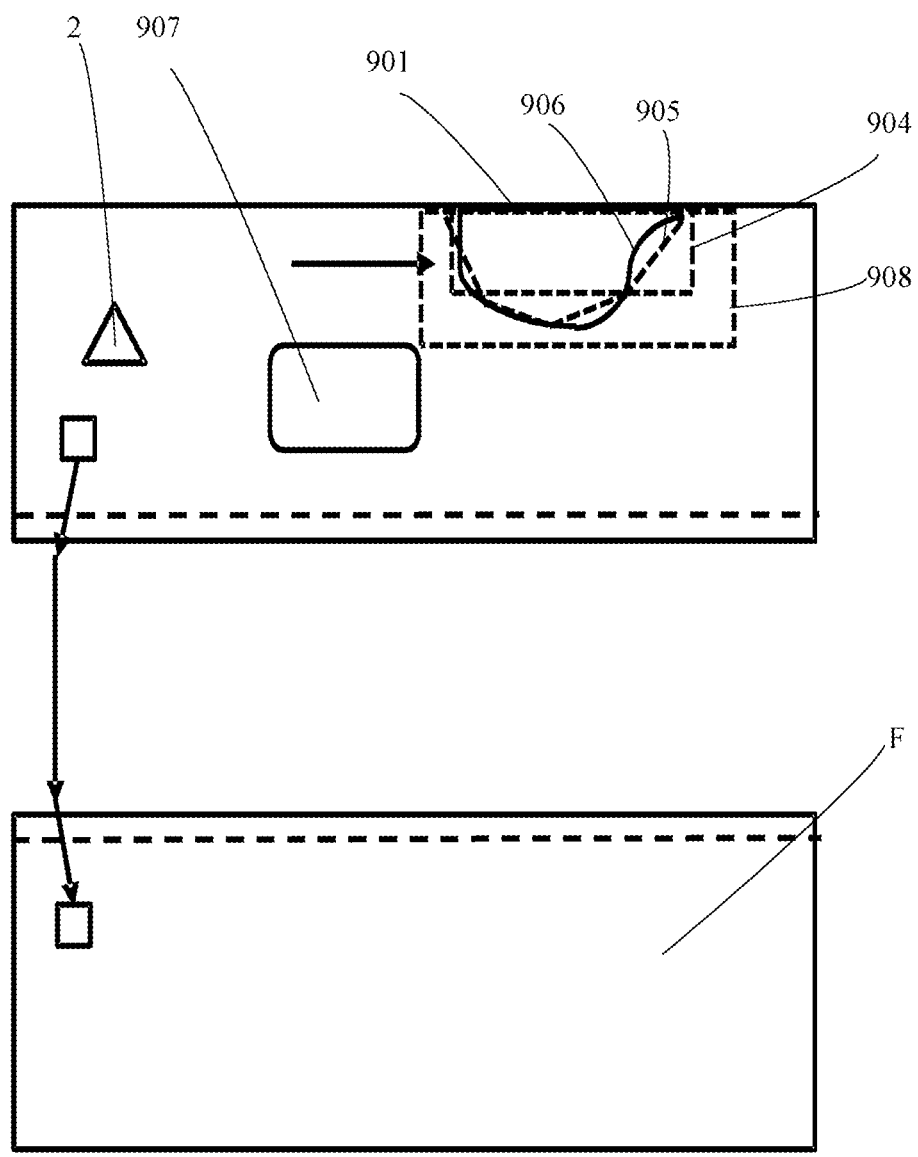
FIG. 5 is a schematic diagram in which a self-moving device obtains a shadow region exploration boundary after exploring a shadow region according to some embodiments.

As shown in FIG. 5, the self-moving device may start from a virtual initial position 908 and move toward the initial shadow region to explore the shadow region. An exploring route may be parallel to an extending direction of the boundary, may be perpendicular to an extending direction of the boundary, or may be inclined relative to an extending direction of the boundary. A shadow region exploration boundary 905 may be obtained through exploration. It can be learned from the figure that the shadow region exploration boundary 905 obtained through the exploration may be very close to a shadow region actual boundary 906. A shadow region may be first explored, to make a map more accurate. In addition, the shadow region is first explored and then the shadow region is processed, to improve the positioning accuracy of the automatic lawn mower and improve a processing effect of the shadow region.

Figure 7:
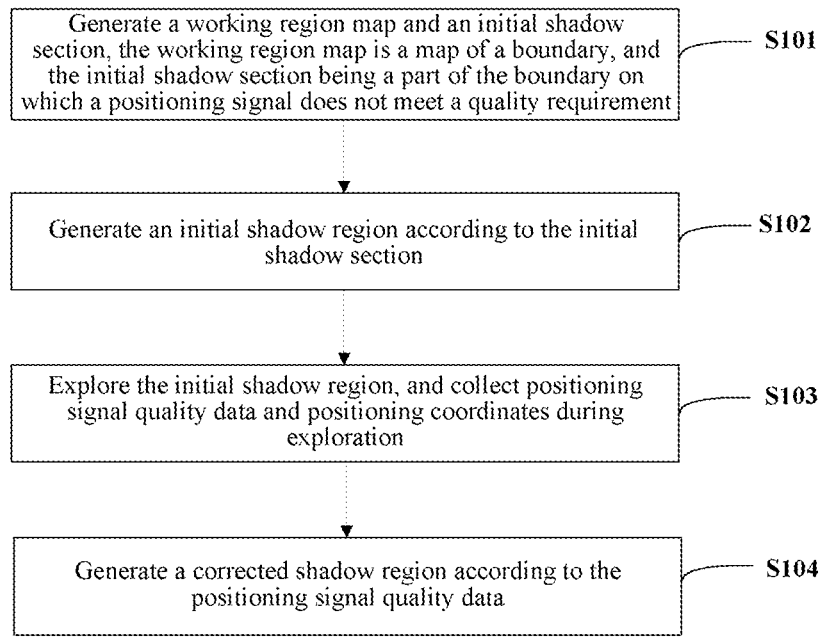
FIG. 7 is a schematic flowchart of a map establishing method according to some embodiments.

FIG. 7 is a schematic flowchart of a map establishing method according to some embodiments. As shown in FIG. 7, the map establishing method includes step S101 to step S103.

S101. Generate a working region map and an initial shadow section, the working region map being a map of a boundary, and the initial shadow section being a part of the boundary on which a positioning signal does not meet a quality requirement.

The working region map may be obtained according to collected basic position data of a working region. The basic position data is obtained through a manual operation.

In some embodiments, an automatic lawn mower is used as an example. The basic position data may be obtained by defining an initial boundary region on map software on an intelligent terminal such as a mobile phone, a tablet, or a computer. The map software may be Google Map, Baidu Map, or the like. Specifically, a satellite map is displayed on the intelligent terminal, and a user finds a rough working region of the automatic lawn mower on the satellite map, frames and downloads the region, and then draws an initial boundary according to the actual working region, that is, collects boundary position data, to obtain an initial boundary region and store the initial boundary region as a map. Data in the stored map is position data corresponding to a boundary drawn on the satellite map. The automatic lawn mower includes a receiving apparatus. The mobile phone, the tablet, or the computer sends boundary position data related to the defined initial boundary region to the receiving apparatus of the automatic lawn mower. The receiving apparatus of the automatic lawn mower receives and stores the boundary position data related to the defined initial boundary region. The mobile phone, the tablet, or the computer sends a coordinate position of the defined initial boundary region to the receiving apparatus in a wireless or wired manner. The wireless manner includes Bluetooth, WiFi, or the like.

In some embodiments, the basic position data is obtained by using a navigator of a self-moving device through a manual operation. For example, the user holds a navigator (or a navigation device) of the automatic lawn mower to walk around an actual boundary of a working region by one circle to obtain the basic position data.

S102. Generate an initial shadow region according to the initial shadow section.

In some embodiments, the initial shadow region includes an enlarged width from the initial shadow section to a working region. The scale width is in a range of 5% to 50% of a length value of the initial shadow section. For example, the scale width is 5% of the length value of the initial shadow section. If the initial shadow section is 20 m, the scale width is 1 m. For example, the scale width is 50% of the length value of the initial shadow section. If the initial shadow section is 20 m, the scale width is 10 m. For example, the scale width is 20% of the length value of the initial shadow section. If the initial shadow section is 20 m, the scale width is 4 m. For example, the scale width is 10% of the length value of the initial shadow section. If the initial shadow section is 20 m, the scale width is 2 m.

In some embodiments, between step S102 and step S101, the method includes the following steps:
  determining whether a length value of the initial shadow section meets a preset condition, if the length value of the initial shadow section meets the preset condition, starting the step of generating an initial shadow region according to the initial shadow section, or otherwise, re-establishing the map. The preset condition is that the length value of the initial shadow section is less than or equal to 60 times a moving speed value of a self-moving device working in a working region. For example, if a moving speed of the self-moving device is 0.3 m/s, the length value of the initial shadow section cannot exceed 18 m, and if the length value exceeds 18 m, the map needs to be re-established. In another example, if the moving speed of the self-moving device is 0.5 m/s, the length value of the initial shadow section cannot exceed 30 m. If the length value exceeds the 30 m, the map needs to be re-established.

S103. Explore the initial shadow region, and collect positioning signal quality data and positioning coordinates during exploration.

S104. Generate a corrected shadow region according to the positioning signal quality data and the positioning coordinates.

The corrected shadow region is implemented by obtaining a positioning signal outputted by the navigator of the self-moving device. The shadow region is a region in which the positioning signal outputted by the navigator of the self-moving device does not meet a quality requirement.

The self-moving device may obtain information about a boundary by using a map of a working region stored in the self-moving device. A user may hold a navigation device to walk around the boundary of the working region by one circle, to obtain the boundary in the map. A position in which boundary information is not clear in the map is obtained. Because a received satellite signal is relatively weak at the position in which the boundary information is not clear, a boundary position in the map is in complete or uncertain. The self-moving device performs shadow region exploration on the position in which the boundary information is not clear.

A same method may be adopted for another obstacle forming a shadow region in the working region, that is, during initial mapping, a user holds a navigation device to walk around an obstacle to obtain a boundary of the obstacle. Because a satellite signal received in the shadow region is relatively weak, an obtained position of the boundary of the obstacle in the map is incomplete or uncertain. The self-moving device performs shadow region exploration on a position near the obstacle in which boundary information is not clear.

After the corrected shadow region is obtained, correction for the working region map may be completed. When the corrected shadow region is obtained, feature points in which positioning signal quality parameters do not meet a set positioning signal quality threshold are obtained, a region range of the shadow region is obtained by connecting the feature points, and the map is corrected by using feature position data of the feature points, to improve the map. The self-moving device provided in these embodiments can rapidly recognize a shadow region and improve a map, to lay a good foundation for the self-moving device to select a direction of entering the shadow region and also provide a basis for highly efficient working of the self-moving device.

Figure 8:
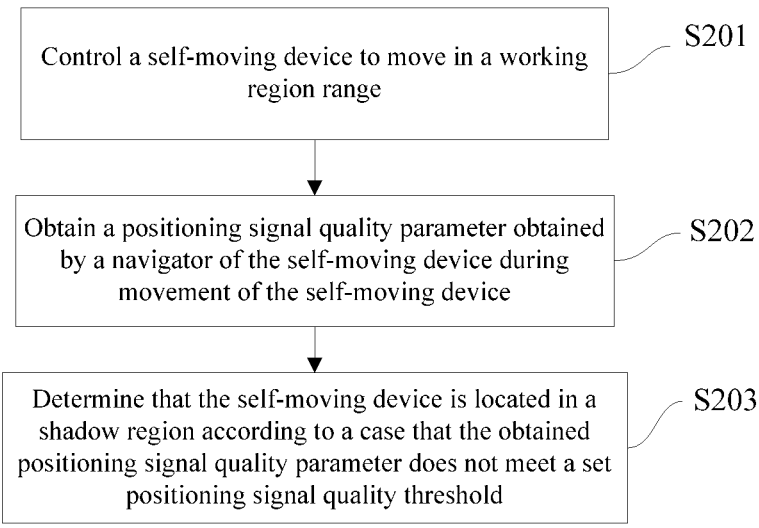
FIG. 8 is a schematic flowchart of some embodiments of obtaining a shadow region in the map establishing method according to some embodiments.

As shown in FIG. 8, in some embodiments, in step S103, the exploring the shadow region of the working region specifically includes step S201 to step S203.

S201. Control a self-moving device to move within a working region range.

S202. Obtain a positioning signal quality parameter obtained by a navigator of the self-moving device during movement of the self-moving device.

S203. Determine that the self-moving device is located in a shadow region according to a case that the obtained positioning signal quality parameter does not meet a set positioning signal quality threshold.

Figure 9:
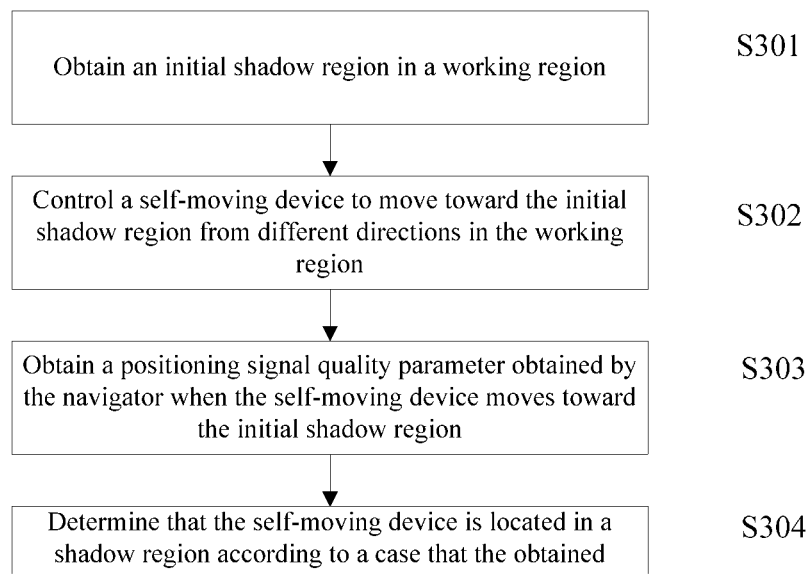
FIG. 9 is a schematic flowchart of some embodiments of obtaining a shadow region in the map establishing method according to some embodiments.

As shown in FIG. 9, in some embodiments, for a case that the initial shadow region has been formed, in step S102, the exploring the shadow region of the working region specifically includes step S301 to step S304.

S301. Obtain an initial shadow region in a working region.

The initial shadow region is a region in which a positioning signal of a corresponding position on a working region map does not meet a quality requirement.

S302. Control a self-moving device to move toward the initial shadow region from different directions in the working region.

S303. Obtain a positioning signal quality parameter obtained by the navigator when the self-moving device moves toward the initial shadow region.

S304. Determine that the self-moving device is located in a shadow region according to a case that the obtained positioning signal quality parameter does not meet a set positioning signal quality threshold.

Specifically, the shadow region may be determined by comparing a detected positioning signal quality parameter with a preset positioning signal quality threshold. For example, the threshold may be determined depending on whether accurate positioning can be performed by using a satellite signal. For example, when a machine may perform accurate positioning, even if GPS is weakened to a certain extent, it is still not necessary to determine that the self-moving device is located in the shadow region. Generally, for example, a part of a region in which a satellite signal is weakened caused by the shielding of buildings or obstacles may be marked as a shadow region, so as to avoid possible increase in the workload of the machine due to the inability to divide the shadow region properly.

The determining a boundary of the corrected shadow region includes the following steps:

obtaining a coordinate point in which a positioning signal quality parameter does not meet the set positioning signal quality threshold during movement of the self-moving device in each direction;

recognizing a boundary point of the corrected shadow region in each direction according to the coordinate point; and connecting boundary points determined in all directions, to form a boundary of the corrected shadow region.

A method of the "recognizing a boundary point of the corrected shadow region in each direction according to the coordinate point" includes: recognizing a coordinate point closest to an exploration starting position in each direction, and using the coordinate point as the boundary point of the corrected shadow region.

Figure 10:
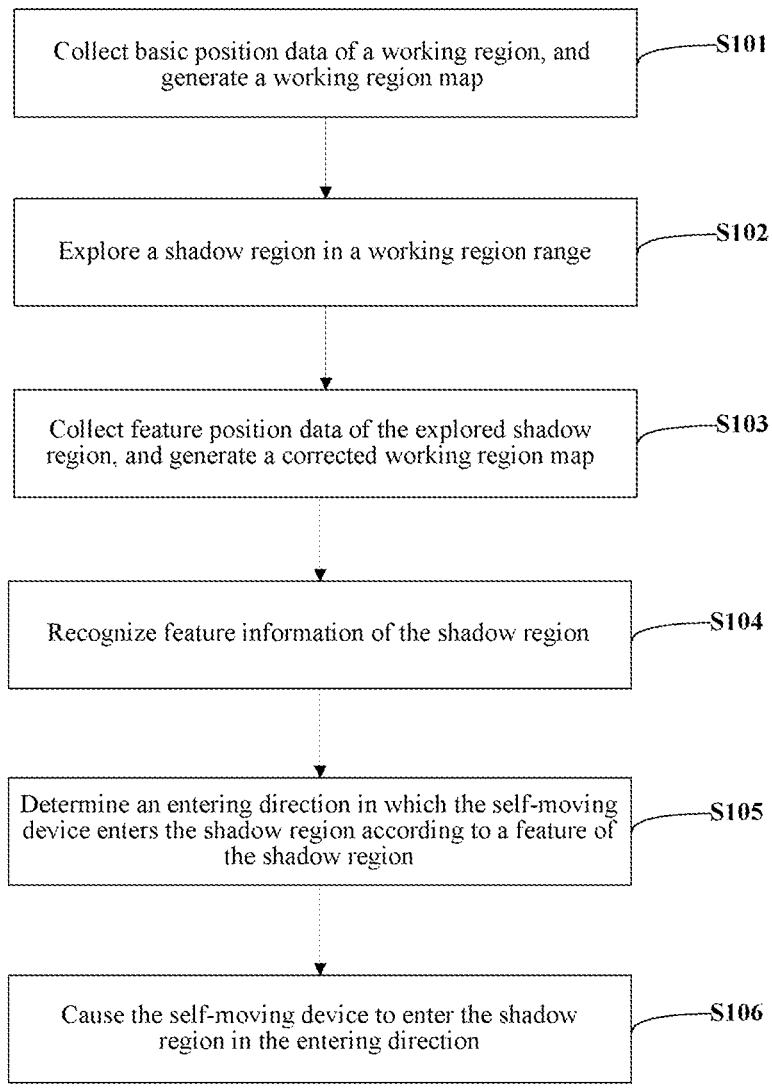
FIG. 10 is a schematic flowchart of entering a shadow region in the map establishing method according to some embodiments.

As shown in FIG. 10, in some embodiments, after step S103, the method includes step S104 to step S106.

S104. Recognize feature information of the shadow region.

The feature information of the shadow region includes a feature of a geometric shape defined by a shadow region boundary formed by outermost points in an explored shadow region.

Alternatively, the feature information of the shadow region includes a feature of a highlighted geometric shape of an entire explored shadow region.

For the foregoing two cases, a longitudinal long-axis may be defined for the shadow region after the geometric shape is obtained. In some embodiments, if the shadow region is of a roughly regular shape such as a roughly rectangular shape, the longitudinal long-axis is parallel to a long side direction of the rectangle, or the shadow region is of a roughly elliptical shape, the longitudinal long-axis is a major axis of the ellipse. In some embodiments, if the shadow region is of an irregular shape, the shadow region may be processed by using a mathematical method known in the art after being approximated into a regular shape, or a longitudinal long-axis may be determined by using another method, and then a subsequent step is performed based on the determined longitudinal long-axis.

S105. Determine an entering direction in which a self-moving device enters the shadow region according to a feature of the shadow region.

In these embodiments, the shadow region includes a first edge roughly extending in an extending direction of a working region boundary and close to the working region boundary, and the entering direction is a direction along a rough normal to the first edge.

Alternatively, the shadow region includes a first edge roughly extending in an extending direction of a working region boundary and close to the working region boundary, and the entering direction is a direction roughly parallel to the first edge.

Alternatively, the entering direction is a direction roughly perpendicular to a longitudinal long-axis of the shadow region.

Alternatively, the shadow region includes a first edge located at one side of a longitudinal long-axis of the shadow region, and the entering direction is a direction along a rough normal to the first edge.

Alternatively, the shadow region includes a first edge close to an obstacle and a second edge away from the obstacle, and the entering direction includes a rough normal to the first edge or the second edge or the entering direction is a direction that minimizes a distance between the first edge and the second edge.

S106. Make the self-moving device enter the shadow region in the entering direction.

In some embodiments, the method may include: presetting a positioning signal quality threshold in the self-moving device. Therefore, the detecting the shadow region in the working region includes: determining that the self-moving device is located in the shadow region according to a case that the obtained positioning signal quality parameter does not meet a quality requirement.

Figure 6:
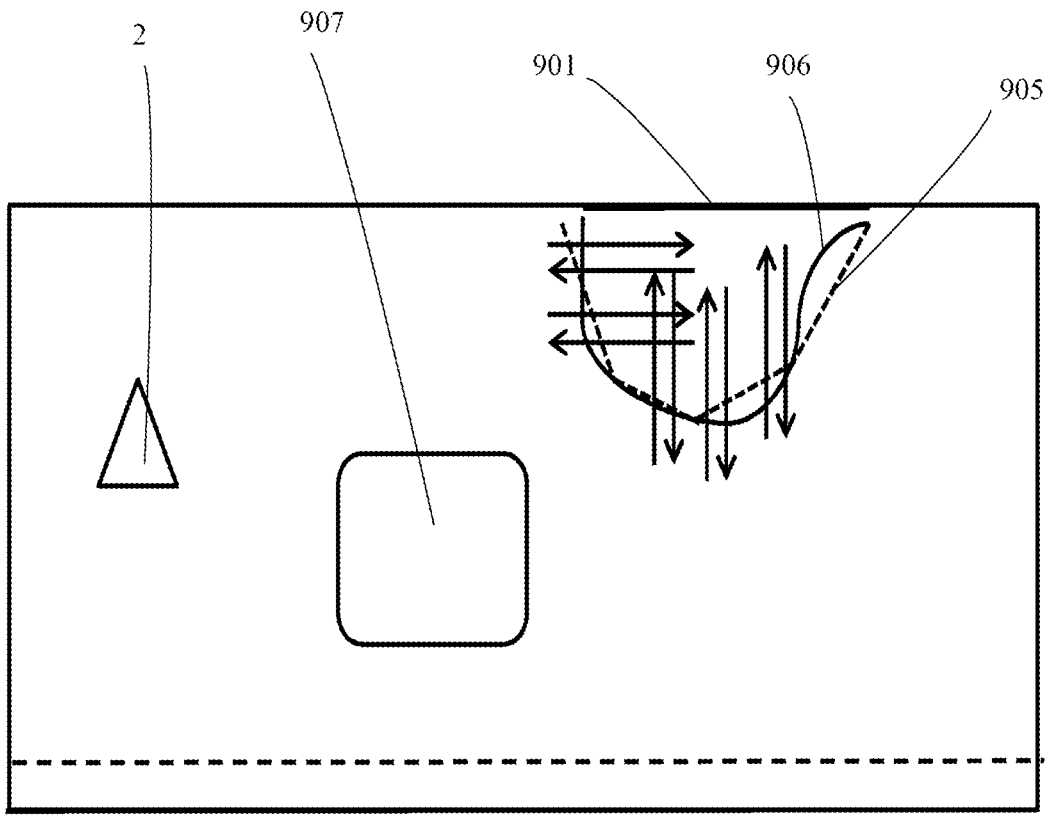
FIG. 6 is a schematic diagram in which a self-moving device processes an explored shadow region in different entering directions according to some embodiments.

After step S106, the method includes: making the self-moving device exit the shadow region in an exit direction opposite to the entering direction. As shown in FIG. 6, after the entering and exiting processes are repeated for a plurality of times, a task for processing the shadow region can be completed. It may be understood that, shadow regions with different areas may be entered from different directions by using a plurality of the foregoing entering directions, to process the shadow region to a maximum extent.

Roughly parallel/rough normal should be understood as relatively wide. In some embodiments, the direction is within plus or minus 30° to a parallel direction/normal. In some optional embodiments, the direction is within plus or minus 20°, or 15°, or 10°, or 5°, or 3° to the parallel direction/normal.

In some embodiments, the selection principle of the direction can minimize time when the self-moving device is in the shadow region, to avoid the impact on the positioning accuracy of the self-moving device due to weak satellite signals. It should be noted that, a direction in which the self-moving device enters the shadow region each time may be the same or may be different. For example, the direction in which the self-moving device enters the shadow region may be determined according to the feature of the geometric shape of the shadow region. However, during mowing operation, optionally, a direction in which the automatic lawn mower enters a same shadow region each time may be the same, to avoid giving the user a feeling of disordered operation of the automatic lawn mower, thereby improving the user experience.

Figure 11:
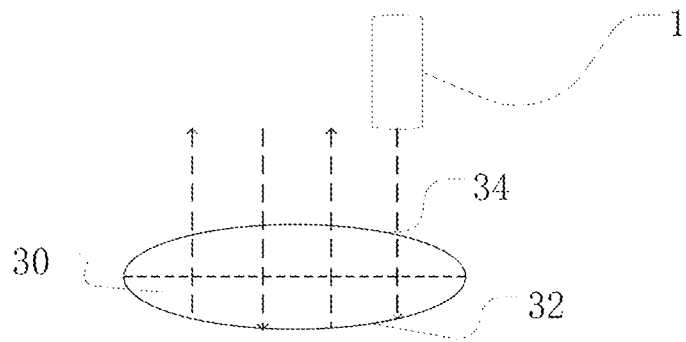
FIG. 11 is a schematic diagram of selection of an entering direction of a shadow region in the map establishing method according to some embodiments.

As shown in FIG. 11, according to a longitudinal long-axis of the shadow region 30, an edge of the shadow region 30 may be divided into a first edge 32 and a second edge 34 that are respectively located on two sides of the longitudinal long-axis. The shadow region 30 is defined by the first edge 32 and the second edge 34. The automatic lawn mower 1 may enter the shadow region 30 in a direction roughly perpendicular to the longitudinal long-axis or along a rough normal to the first edge 32 or the second edge 34. It may be understood that the direction is also a direction that minimizes a distance between the first edge and the second edge.

Figure 12:
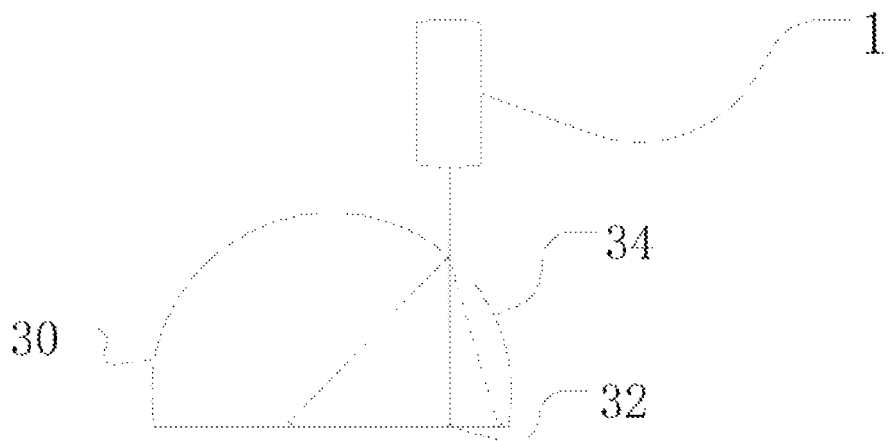
FIG. 12 is a schematic diagram of selection of an entering direction of a shadow region in the map establishing method according to some embodiments.

As shown in FIG. 12, the automatic lawn mower 1 may enter the shadow region 30 in the direction that minimizes the distance between the first edge 32 and the second edge 34. The automatic lawn mower 1 may select various directions to enter the shadow region 30. Compared with other directions, a direction to which a solid line arrow points is a shortest path from the second edge 34 to the first edge 32. The shortest distance herein is not limited to the absolute shortest, but is an optimal path from the second edge 34 to the first edge 32. It may be understood that the shortest distance may also be understood as a smallest average value of a moving distance of the automatic lawn mower 1 from the first edge 32 to the second edge 34 and a moving distance of the automatic lawn mower from the second edge 34 to the first edge 32 when the automatic lawn mower 1 completes cutting of the shadow region 30 in a path parallel to the entering direction.

The shadow region in the working region is formed due to a building or another obstacle, so that signal weakening regions are formed on one or more sides of the building or the obstacle. For example, the shape of the shadow region may be a shape extending outward from a lower edge of the building or the obstacle. In this case, the first edge 32 may be an intersection line of the building or the obstacle and a working region, and the second edge 34 may be formed by connecting points that are located near the building or the obstacle and of which signal quality parameters start meeting a preset threshold (the principle of the preset threshold is, for example, whether accurate navigation can be performed according to a strength of the satellite signal). The first edge 32 and the second edge 34 may surround to form a closed pattern. For example, a semi-circular closed structure may be formed by the first edge and the second edge. During operation of the self-moving device, to minimize time when the self-moving device is in the shadow region, for example, the self-moving device may enter the shadow region in a direction along the rough normal to the first edge 32 or the second edge 34 or in the direction that minimizes the distance between the first edge 32 and the second edge 34.

A walking path of the self-moving device may be set by a program. The program may simulate various walking manners of the self-moving device and determine a length of a path in which the self-moving device passes through the shadow region in a walking manner, to select a walking manner in which the self-moving device walks in the shadow region by using a shortest path. Optionally, a walking direction of the self-moving device in a region may be consistent and continuous, that is, a direction is not adjusted with the small change of a shape of a boundary, to avoid giving the user an impression of "unintelligent".

It should be noted that, in these embodiments, the shadow region is determined according to a strength of a satellite signal received by the self-moving device/the mobile station. Specifically, a quality threshold of a received satellite signal may be preset, that is, the positioning signal quality threshold. When a satellite signal quality parameter, that is, the positioning signal quality parameter, received by the self-moving device does not meet the preset positioning signal quality threshold, it is determined that the region is a shadow region.

In some embodiments, the method includes: presetting a positioning signal quality threshold in the self-moving device. The making the self-moving device enter the shadow region in the foregoing direction includes: enabling, by the self-moving device, an inertial navigation signal when a satellite signal quality parameter obtained by the self-moving device does not meet the positioning signal quality threshold; and recovering a satellite navigation signal when the satellite signal quality parameter obtained by the self-moving device meets the positioning signal quality threshold. In these embodiments, the inertial navigation signal and the satellite navigation signal are switched based on the strength of the signal, to ensure accurate positioning of the machine.

In some embodiments, for example, the making the self-moving device enter the shadow region in the foregoing direction includes: simultaneously enabling satellite navigation and inertial navigation; and using a weighted value of a satellite navigation result and an inertial navigation result as a navigation result. As described above, an error of the inertial navigation is gradually increased over time, resulting in increasingly low navigation accuracy. In these embodiments, the inertial navigation and the satellite navigation may be combined to complement each other, to implement more accurate positioning of the machine in the shadow region.

In some embodiments, the satellite positioning device may alternatively be replaced by another positioning device, which is referred to as a first positioning device. The first positioning device outputs a first positioning signal. The first positioning device may be an ultra-wideband (UWB) positioning device, an ultrasonic beacon positioning device, or the like.

In some embodiments, the inertial navigation device may alternatively be replaced by another positioning device, which is referred to as a second positioning device. The second positioning device outputs a second positioning signal. The second positioning device may be an image acquisition device, a capacitive lawn detection device, or the like.

In some embodiments, the map establishing method includes: presetting a time threshold in the shadow region; and controlling the self-moving device to enter the shadow region and exit the shadow region, so that a sum of an entering time of entering the shadow region and an exit time of exiting the shadow region meets the time threshold. With this arrangement, regardless of the shape of the shadow region and the entering direction, the shadow region can be entered to perform operation while the positioning accuracy is ensured provided that a time is controlled.

Figure 15:
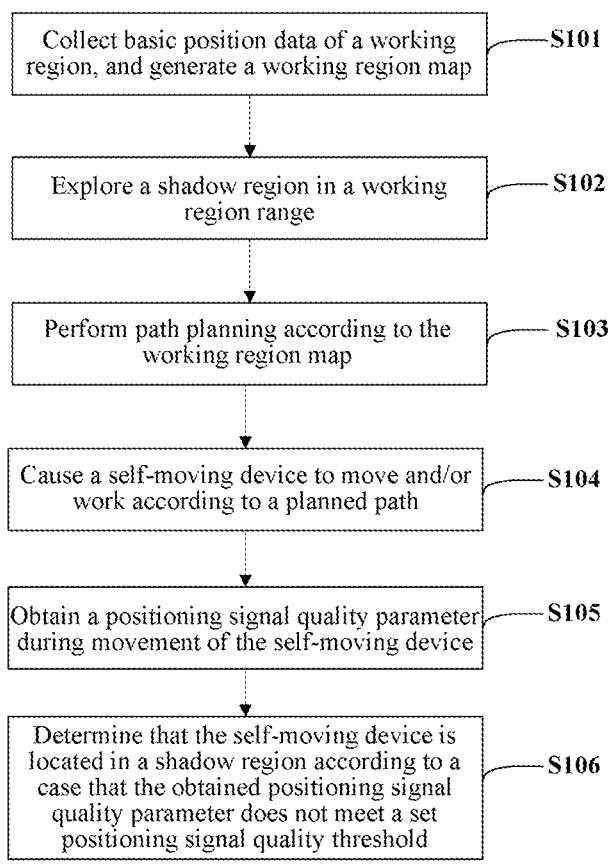
FIG. 15 is a schematic flowchart of a map establishing method according to some embodiments.

In some embodiments of this application, different from the map establishing method, in these embodiments, after step S102 of generating an initial shadow region according to the initial shadow section, as shown in FIG. 15, the method may include the following step S103 to step S106.

S103. Perform path planning according to a working region map.

S104. Make a self-moving device move and/or work according to a planned path.

S105. Obtain a positioning signal quality parameter during movement of the self-moving device.

S106. Determine that the self-moving device is located in a shadow region according to a case that the obtained positioning signal quality parameter does not meet a set positioning signal quality threshold.

Figure 16:
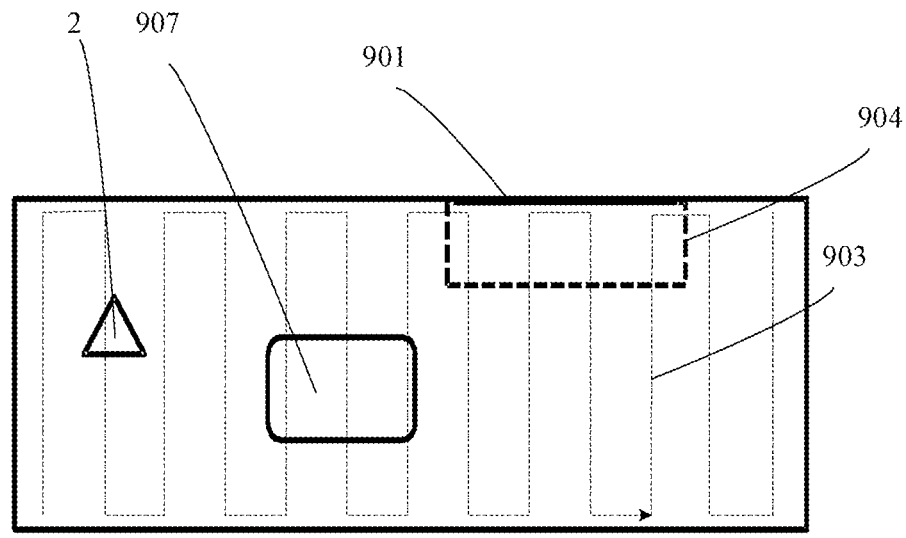
FIG. 16 is a schematic diagram of path planning of a self-moving device according to some embodiments.
Figure 17:
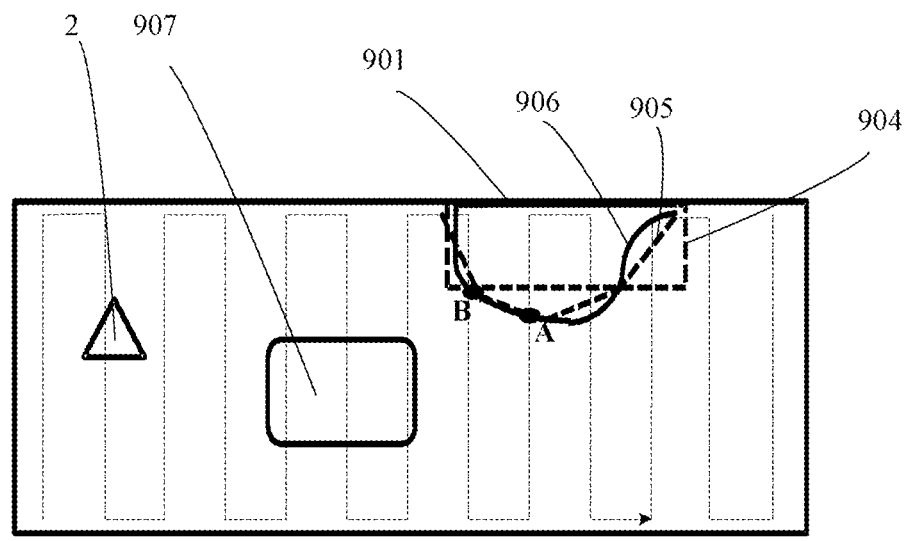
FIG. 17 is a schematic diagram in which a self-moving device obtains a shadow region exploration boundary after exploring a shadow region according to some embodiments.

The difference between these embodiments and the foregoing embodiments is that: in these embodiments, after obtaining the working region map and the initial shadow region, the self-moving device ends mapping, enters a working process, and corrects the initial shadow region during working, to generate a corrected shadow region. Specifically, after step S102, a current mapping process may be first ended, and path planning is performed according to the working region map, to obtain a path planning graph shown in FIG. 16. A dashed line 903 is a planned path, and the self-moving device is controlled to walk according to the path. During walking, the self-moving device detects the positioning signal quality parameter during walking. As shown in FIG. 17, when it is detected that a positioning signal quality parameter of a current position does not meet a signal quality threshold, it indicates that the current position is near a shadow region, so that the self-moving device may record coordinates of the current position and may be controlled to continue to walk. It should be noted that that the positioning signal quality parameter does not meet the signal quality threshold may be that the self-moving device walks from a region with good signal quality to a region with poor signal quality such as a coordinate point A in FIG. 17, or may be that the self-moving device walks from the region with poor signal quality to the region with good signal quality such as a coordinate point B in FIG. 17.

In these embodiments, to ensure signal quality when the self-moving device walks to work, reference may be made to a manner of performing working surface processing in the embodiments of the map establishing method, the self-moving device is controlled to enter the shadow region and exit the shadow region, so that a sum of an entering time of entering the shadow region and an exit time of exiting the shadow region meets the time threshold. Alternatively, a walking manner similar to the manner of performing working surface processing in the embodiments of the map establishing method may be adopted.

In these embodiments, when it is detected that recorded coordinates that do not meet the signal quality threshold reach a preset value (for example, ten), the self-moving device may be controlled to update the map. Alternatively, when it is detected that the self-moving device has walked through a complete working region, the self-moving device may be controlled to update the map. Specifically, the map may be updated in the following manner, including:

obtaining a coordinate point in which the positioning signal quality parameter does not meet the set positioning signal quality threshold when the self-moving device moves according to the planned path;

recognizing a boundary point of the corrected shadow region according to the coordinate point; and connecting boundary points determined in the planned path, to form a boundary of the corrected shadow region.

In the manner, the map may be updated with reference to the initial shadow region and the boundary point, to obtain a corrected map. A boundary such as an exploration boundary 905 in FIG. 17 of the corrected shadow region is marked in the map. It should be noted that boundaries or paths in FIG. 17 are merely examples, which do not constitute a limitation on this application.

Similarly, a same method may be adopted for another obstacle forming a shadow region in the working region. That is, during working, the shadow region corresponding to the obstacle is explored in the manner. During subsequent working of the self-moving device, a similar manner may alternatively continue to be used to explore an encountered shadow region. This is not limited in this application.

Figure 13:
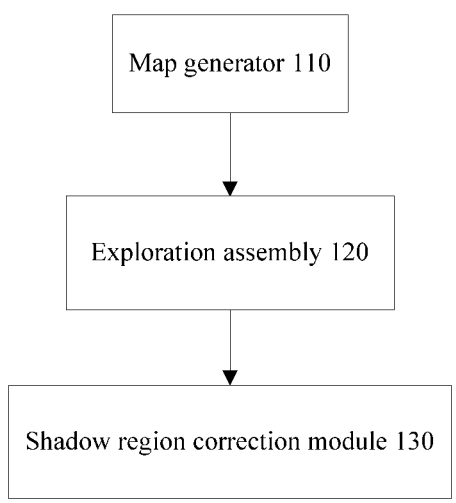
FIG. 13 is a partial schematic structural diagram of a self-moving device according to some embodiments.

FIG. 13 is a schematic structural diagram of a self-moving device according to some embodiments; As shown in FIG. 13, the self-moving device includes a map generator 110, an exploration assembly 120, and a shadow region corrector 130. The map generator 110 is configured to collect basic position data of a working region, generate a working region map and an initial shadow section, and generate an initial shadow region according to the initial shadow section. The exploration assembly 120 is configured to explore the initial shadow region within a working region range and collect positioning signal quality data and positioning coordinates during exploration, to generate a corrected shadow region. The shadow region corrector 130 is configured to generate the corrected shadow region according to the positioning signal quality data and the positioning coordinates, to correct the working region map.

In these embodiments, the map generator 110 and the shadow region corrector 130 may include hardware such as a circuit structure and an input/output device, may include software such as a program implementing a function, or may include a combination of software and hardware provided that a specific function can be implemented.

In these embodiments, basic position data of a working region includes a boundary of the working region, or an obstacle (including an isolated island) in the working region, or a channel connecting different working regions, and includes a position of a charging station, a path in which the automatic lawn mower leaves or returns to the charging station, and the like.

The map generator 110 or the shadow region corrector 130 may automatically collect the basic position data of the working region or may collect the basic position data of the working region through a manual operation.

The basic position data of the working region is automatically collected by using the controller. The controller obtains a positioning signal outputted by a navigator of a self-moving device and extracts the basic position data based on generation of the working region map.

The basic position data of the working region may be collected by using an intelligent terminal through a manual operation. Specifically, the map generator 110 and the shadow region corrector 130 are communicatively connected to an external intelligent terminal. The external intelligent terminal may be a mobile phone, a tablet, or the like of a user. The map generator 110 displays a satellite map in the intelligent terminal by using an existing satellite map such as Google Map or Baidu Map, and defines a working region manually defined by the user. An example in which a boundary of a working region is set is used for the following description of the steps. It may be understood that a manner of obtaining another feature position data of an obstacle in the working region is similar to the example. Specifically, a satellite map is displayed on the intelligent terminal, and a user finds a rough working region of the automatic lawn mower on the satellite map, frames and downloads the region, then draws a boundary according to an actual working region, that is, collects boundary position data, and stores the boundary position data as a map. Data in the stored map is basic position data corresponding to a boundary drawn on the satellite map. In these embodiments, the automatic working system includes application software. The application software is loaded on an external intelligent terminal, and a user obtains a satellite map by using the application software from the intelligent terminal and draws a boundary by using the application software, that is, collects boundary position data.

In some embodiments, the self-moving device includes a navigator, configured to output a positioning signal. The shadow region is a region in which the positioning signal outputted by the navigator does not meet a quality requirement.

In some embodiments, the self-moving device includes a signal quality obtaining assembly. The signal quality obtaining assembly is configured to obtain a positioning signal quality parameter obtained by the navigator during movement of the self-moving device, and determine that the self-moving device is located in a shadow region according to a case that the obtained positioning signal quality parameter does not meet a set positioning signal quality threshold.

In some embodiments, the self-moving device includes an initial shadow region obtaining assembly. The initial shadow region obtaining assembly is configured to obtain an initial shadow region in a working region. The controller controls the self-moving device to move toward the initial shadow region from different directions in the working region for exploring an actual area of the shadow region. The signal quality obtaining assembly obtains the positioning signal quality parameter outputted by the navigator when the self-moving device moves toward the initial shadow region, and determines that the self-moving device is located in the shadow region according to the case that the obtained positioning signal quality parameter does not meet the set positioning signal quality threshold. The initial shadow region is a region in which a positioning signal quality parameter of a corresponding position on a working region map does not meet a positioning signal quality threshold. An actual area of the shadow region is explored, to provide a basis for the self-moving device to enter the shadow region for working subsequently, so that the self-moving device plans a direction of entering the shadow region and a time of entering the shadow region, and the self-moving device may select an optimal entering direction (which may be a plurality of directions) and set a suitable shadow region staying time according to the actual area of the shadow region, to ensure the positioning accuracy of the self-moving device and improve the processing efficiency and effect of the shadow region. The initial shadow region obtaining assembly may move toward the initial shadow region within a working region range, detect feature points in which positioning signal quality parameters do not meet the positioning signal quality threshold, and obtain an explored shape of the shadow region by connecting the feature points. The self-moving device provided in these embodiments can rapidly recognize a shadow region, to lay a good foundation for the self-moving device to select a suitable direction of entering the shadow region and planning of a plurality of directions.

In some embodiments, the controller is configured to recognize feature information of the shadow region, determine an entering direction in which the self-moving device enters the shadow region according to a feature of the shadow region, and make the self-moving device enter the shadow region in the entering direction. Specifically, the controller is configured to recognize a boundary of the shadow region, determine an entering direction in which the self-moving device enters the shadow region according to a boundary feature of the shadow region, and make the self-moving device enter the shadow region in the entering direction. In some embodiments, an actual range of a shadow region is first explored, and then a direction in which the self-moving device enters the shadow region is selected according to a shadow region boundary obtained through exploration. With such arrangement, a staying time of the self-moving device in the shadow region can be effectively controlled, a processing mode of the shadow region can be reasonably planned, and the positioning accuracy of the self-moving device can be improved.

A method for correcting a shadow region by using the exploration assembly 120 may include: determining a shadow region by detecting a strength of a satellite signal. Specifically, an initial shadow region may be obtained by initial mapping. A specific method is that a positioning signal quality threshold of a received differential GPS signal is set in the controller, and the self-moving device walks around, for example, a building (or a differential GPS mobile station is removed manually and the mobile station is carried to move around a position of a boundary of a signal strength, points in which a signal strength does not meet a quality threshold are recorded, and then the points are connected, to obtain a shape of a shadow region), so that points in which positioning signal quality parameters are less than or equal to a preset positioning signal quality threshold are marked in a map, and after sufficient feature signal point are selected, the points on the boundary may be connected, to obtain the initial shadow region.

The establishing of the initial shadow region is limited to a manual walking position in most cases. Because during initial mapping, people generally walk along a working region boundary or a boundary of an obstacle by one circle, an area of the obtained initial shadow region is very small.

The controller may control the self-moving device to adjust a posture by using a current position and posture information of the self-moving device and a shape defined by a boundary of a shadow region and position information of the shadow region when the self-moving device reaches an edge outside the shadow region, so that the self-moving device enters the shadow region in a specific direction, or adjust an entire walking direction of the self-moving device in this region according to a shape defined by a boundary of a shadow region in this region, so that the self-moving device walks continuously.

In these embodiments, the shadow region includes a first edge roughly extending in an extending direction of a working region boundary and close to the working region boundary, and the entering direction is a direction along a rough normal to the first edge.

Alternatively, the shadow region includes a first edge roughly extending in an extending direction of a working region boundary and close to the working region boundary, and the entering direction is a direction roughly parallel to the first edge.

Alternatively, the entering direction is a direction roughly perpendicular to a longitudinal long-axis of the shadow region.

Alternatively, the shadow region includes a first edge located at one side of a longitudinal long-axis of the shadow region, and the entering direction is a direction along a rough normal to the first edge.

Alternatively, the shadow region includes a first edge close to an obstacle and a second edge away from the obstacle, and the entering direction includes a direction along a rough normal to the first edge or the second edge or the entering direction is a direction that minimizes a distance between the first edge and the second edge.

The self-moving device travels in a direction roughly perpendicular to a longitudinal long-axis of the shadow region, or along a rough normal to a first edge or a second edge, or in a direction that minimizes a distance between the first edge and the second edge. It may be understood that, compared with traveling in another direction, a traveling distance of the self-moving device in the shadow region is relatively short, an accumulated error is relatively small, and the positioning is more accurate.

It may be understood that, shadow regions with different areas may be entered from different directions by using a plurality of entering directions, to process the shadow region to a maximum extent.

Roughly parallel/rough normal should be understood as relatively wide. In some embodiments, the direction is within plus or minus 30° to a parallel direction/normal. In some optional embodiments, the direction is within plus or minus 20°, or 15°, or 10°, or 5°, or 3° to the parallel direction/normal.

In some embodiments, the selection principle of the direction can minimize a time when the self-moving device is in the shadow region, to avoid the impact on the positioning accuracy of the self-moving device due to weak satellite signals. It should be noted that, a direction in which the self-moving device enters the shadow region each time may be the same or may be different. For example, the direction in which the self-moving device enters the shadow region may be determined according to the feature of the geometric shape of the shadow region. However, during mowing operation, optionally, a direction in which the automatic lawn mower enters a same shadow region each time may be the same, to avoid giving the user a feeling of disordered operation of the automatic lawn mower, thereby improving the user experience.

As shown in FIG. 6, after making the self-moving device enter the shadow region in the entering direction, the controller makes the self-moving device exit the shadow region in an exit direction opposite to the entering direction.

In some embodiments, the self-moving device includes a time presetter. The time presetter is configured to preset a time threshold of the self-moving device in the shadow region, where the controller controls the self-moving device to enter the shadow region and exit the shadow region, so that a sum of an entering time of entering the shadow region and an exit time of exiting the shadow region meets the time threshold.

In these embodiments, the mobile station 9 includes an auxiliary positioning apparatus. The auxiliary positioning apparatus includes a pedometer, a laser radar, a camera, an odometer, an ultrasonic wave, and the like. The inertial navigation apparatus may also be considered as an auxiliary positioning apparatus. The auxiliary positioning apparatus is configured to match differential GPS positioning when a differential GPS signal is poor. A positioning error is corrected by using a correction value outputted by the auxiliary positioning apparatus, so that the accuracy of a generated map is higher.

In some embodiments, the mobile station 9 includes a path generator, configured to generate path planning according to the working region map. First, a working region is divided according to a boundary, an obstacle, a channel, or the like of the working region. The division of the working region makes coverage of the automatic lawn mower more efficient. For example, the working region is divided into two sub-working regions connected by a channel. When performing mowing, the automatic lawn mower covers one sub-working region, and then enters the other sub-working region through the channel. In this manner, low efficient working caused by that the automatic lawn mower moves back and forth between two ends of the channel is avoided. In another example, two parts in the working region separated by an obstacle are divided into two sub-regions, to prevent the automatic lawn mower from encountering the obstacle frequently. A part with a regular boundary shape and a part with an irregular boundary shape may be divided into different sub-regions according to a boundary shape. In this manner, the automatic lawn mower may cover a regular sub-region according to a regular path and cover an irregular sub-region according to a random path. In these embodiments, adjacent sub-regions have an overlapping part, to prevent a part between the adjacent sub-regions from being unable to be covered. In these embodiments, a size of a partition is determined by estimating an area of a region in which a battery pack is used for working once according to a battery pack level. In these embodiments, partitioning may be performed according to a plant growth condition, so that the automatic lawn mower has a high cutting power and a long cutting time when being in a region with lush plants, and has a low cutting power and a short cutting time when being in a region with sparse plants. In these embodiments, partitioning may be performed according to a degree of importance of a region. For example, a front yard and a back yard of the user are divided into different sub-regions, so that the automatic lawn mower works in the front yard and the back yard by using different working policies. Certainly, partitioning may be performed according to comprehensive factors such as a quantity of obstacles.

After region division is performed, a path of the automatic lawn mower in each sub-region is planned. A preset path of the automatic lawn mower in each sub-region may be a regular path such as a parallel path or a spiral path, or may be a random path.

A computer-readable storage medium is provided, storing computer program instructions, the computer program instructions, when executed by a processor, making the processor perform steps of the "map establishing method" in this specification.

The computer-readable storage medium may use any combination of one or more readable media. The readable medium may be a readable signal medium or a readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a random access memory (RAM), a read-only memory (ROM), an erasable programmable ROM (EPROM or a flash memory), an optical fiber, a CD-ROM, an optical storage device, a magnetic storage device, or any appropriate combination thereof.

To implement the foregoing embodiments, some embodiments provides a computer program product, where when instructions in the computer program product are executed by a processor, the map establishing method is implemented, the method including:
  obtaining boundary information of a working region;
  controlling a self-moving device to depart from a reference point position to a boundary and move along the boundary;
  obtaining a current positioning signal of the self-moving device during movement, a reference positioning signal of the self-moving device before the current positioning signal and position information of the reference positioning signal being used for determining current position information; and
  obtaining information data of the self-moving device during movement, and controlling the self-moving device to leave the boundary when an information data value reaches a set measurement threshold.

A computer program product is provided, including computer program instructions, where the computer program instructions, when being executed by a processor, make the processor perform the steps of the "map establishing method" in this specification.

The computer program product may write the program code used for executing the operations of this application by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server.

In order to implement the foregoing embodiments, some embodiments provides an electronic device, including:
  a memory, configured to store computer executable instructions; and
  a processor, configured to execute the computer executable instructions stored in the memory, to perform the map establishing method, the method including:
  obtaining boundary information of a working region;
  controlling a self-moving device to depart from a reference point position to a boundary and move along the boundary;
  obtaining a current positioning signal of the self-moving device during movement, a reference positioning signal of the self-moving device before the current positioning signal and position information of the reference positioning signal being used for determining current position information; and
  obtaining information data of the self-moving device during movement, and controlling the self-moving device to leave the boundary when an information data value reaches a set measurement threshold.

The electronic device may be an electronic device integrated in a mobile station of the self-moving device or a stand-alone device independent of the mobile station. The stand-alone device may communicate with the mobile station to implement the map establishing method according to some embodiments.

Figure 14:
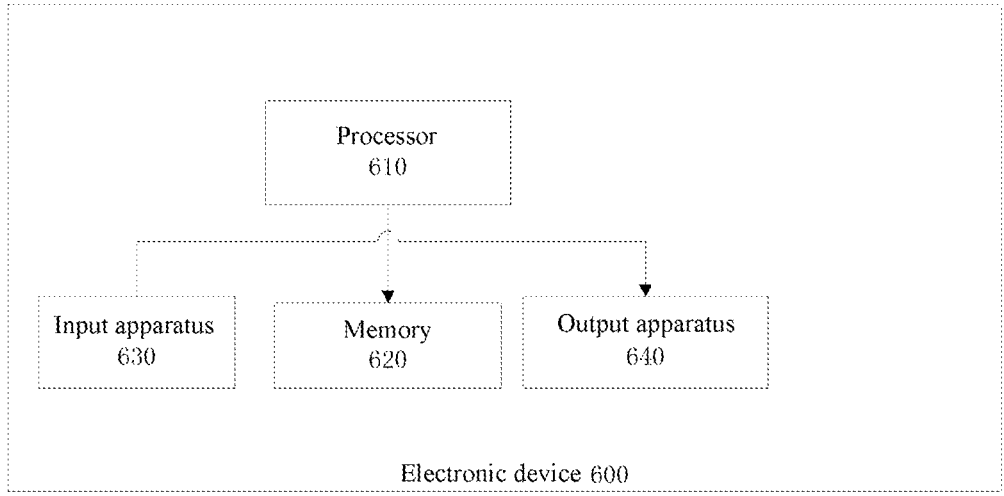
FIG. 14 is a schematic block diagram of an electronic device according to some embodiments.

FIG. 14 is a schematic block diagram of an electronic device according to some embodiments. As shown in FIG. 14, the electronic device 600 includes one or more processors 610 and a memory 620. The processor 610 may be a central processing unit (CPU) or another form of processing unit with data processing capabilities and/or instruction execution capabilities, and may control other components in the electronic device 600 to perform desired functions. The memory 620 may include one or more computer program products, and the computer program products may include various forms of computer-readable storage media, for example, a volatile memory and/or a non-volatile memory. For example, the volatile memory may include a random access memory (RAM) and/or a high-speed cache. For example, the non-volatile memory may include a ROM, a hard disk, and a flash memory. When the computer-readable storage medium may store one or more computer program instructions, the processor 610 may run the program instructions, to implement the map establishing method and/or another expected function of the self-moving device according to some embodiments. The computer-readable storage medium may store content such as position data of antenna and a mounting position of the antenna relative to the self-moving device.

In an example, the electronic device 600 may include: an input apparatus 630 and an output apparatus 640. These components are interconnected by a bus system and/or other forms of connection mechanisms (not shown).

For example, the input apparatus 630 may be configured to receive user inputs.

The output apparatus 640 may directly output various information to the outside, or control the mobile station to transmit signals.

Certainly, for brevity, FIG. 14 merely shows some of the components related to this application in the electronic device 600, and omits the components such as the bus, input/output interfaces, and the like. In addition, the electronic device 600 may also include any other appropriate components according to specific application conditions.

It should be understood that each part of the present disclosure may be implemented by hardware, software, firmware, or a combination thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

In addition, each functional unit in each embodiment of the present disclosure may be integrated into one processor, or each unit may exist alone physically, or two or more units may be integrated into one module. The integrated module may be implemented in the form of hardware, or may be implemented in a form of a software functional module. If implemented in the form of software functional modules and sold or used as an independent product, the integrated module may also be stored in a computer-readable storage medium.

Although only several embodiments of the present disclosure are described and illustrated in this specification, a person skilled in the art should easily foresee other means or structures used to perform the functions described here or obtain the structures described here. All such variations or changes should be considered falling within the scope of the present disclosure.

What is claimed is:

1. A map establishing method, comprising:
   generating a working region map and an initial shadow section, the working region map being a map of a boundary of a working region, the initial shadow section being a part of the boundary of the working region on which a positioning signal does not meet a quality requirement, and a positioning of the initial shadow section obtained based on the positioning signal being inaccurate;
   generating an initial shadow region according to the initial shadow section, wherein the initial shadow region expands inwardly from the initial shadow section into the working region;
   exploring the initial shadow region, and collecting positioning signal quality data and positioning coordinates during exploration; and
   generating a corrected shadow region according to the positioning signal quality data and the positioning coordinates.

2. The map establishing method according to claim 1, further comprising:
   determining whether a length value of the initial shadow section meets a preset condition, wherein generating the initial shadow region according to the initial shadow section comprises:
   if the length value of the initial shadow section meets the preset condition, generating the initial shadow region according to the initial shadow section.

3. The map establishing method according to claim 2, wherein the preset condition includes the length value of the initial shadow section being less than or equal to 60 times a moving speed value of a self-moving device working in a working region.

4. The map establishing method according to claim 1, wherein exploring the initial shadow region comprises:
   controlling a self-moving device to move toward the initial shadow region in a working region;
   obtaining a positioning signal quality parameter during movement of the self-moving device; and
   determining that the self-moving device is located in a shadow region in response to determining that the obtained positioning signal quality parameter does not meet a set positioning signal quality threshold.

5. The map establishing method according to claim 4, further comprising: controlling the self-moving device to move toward the initial shadow region multiple times from the working region in different directions.

6. The map establishing method according to claim 5, wherein before controlling the self-moving device to move toward the initial shadow region in the working region, the method further comprises:
   generating an exploration starting position according to a position of the initial shadow region, wherein the self-moving device performs the exploration from the exploration starting position.

7. The map establishing method according to claim 5, wherein generating the corrected shadow region according to the positioning signal quality data and the positioning coordinates comprises:
   obtaining a coordinate point in which a corresponding positioning signal quality parameter does not meet the set positioning signal quality threshold during movement of the self-moving device in each direction;
recognizing a boundary point of the corrected shadow region in each direction according to the coordinate point; and
connecting boundary points determined in all directions, to form a boundary of the corrected shadow region.

8. The map establishing method according to claim 1, wherein exploring the initial shadow region comprises:
performing path planning according to the working region map;
making a self-moving device to move and/or work according to a planned path;
obtaining a positioning signal quality parameter during movement of the self-moving device; and
determining that the self-moving device is located in a shadow region in response to determining that the obtained positioning signal quality parameter does not meet a set positioning signal quality threshold.

9. The map establishing method according to claim 8, wherein generating the corrected shadow region according to the positioning signal quality data and the positioning coordinates comprises:
obtaining a coordinate point in which a corresponding positioning signal quality parameter does not meet the set positioning signal quality threshold when the self-moving device moves according to the planned path;
recognizing a boundary point of the corrected shadow region according to the coordinate point; and
connecting boundary points determined in the planned path, to form a boundary of the corrected shadow region.

10. The map establishing method according to claim 1, wherein after generating the corrected shadow region according to the positioning signal quality data and the positioning coordinates, the method further comprises:
recognizing a feature of the corrected shadow region;
determining an entering direction in which a self-moving device enters the corrected shadow region according to the feature of the corrected shadow region; and
making the self-moving device to enter the corrected shadow region in the entering direction to perform working surface processing.

11. The map establishing method according to claim 10, wherein the corrected shadow region comprises a first edge extending in an extending direction of a working region boundary, and the entering direction is a direction within a predetermined angle from a normal to the first edge.

12. The map establishing method according to claim 10, wherein the corrected shadow region comprises a first edge extending in an extending direction of a working region boundary, and the entering direction is within a predetermined angle from a direction parallel to the first edge.

13. The map establishing method according to claim 10, wherein the entering direction is within a predetermined angle from a direction perpendicular to a longitudinal long-axis of the corrected shadow region.

14. A self-moving device, comprising:
a housing;
a mover, configured to drive the housing to move;
a task executor, configured to perform a working task;
a controller, electrically connected to the mover and the task executor, and configured to control the mover to drive the self-moving device to move and control the task executor to perform the working task;
a map generator, configured to generate a working region map and an initial shadow section, and generate an initial shadow region according to the initial shadow section, wherein the initial shadow section being a part of a boundary of the working region map, and a positioning of the initial shadow section obtained based on a positioning signal is inaccurate, and wherein the initial shadow region expands inwardly from the initial shadow section into the working region;
an exploration assembly, configured to explore the initial shadow region within a working region range and collect positioning signal quality data and positioning coordinates during exploration, to generate a corrected shadow region; and
a shadow region corrector, configured to generate the corrected shadow region according to the positioning signal quality data and the positioning coordinates.

15. The self-moving device according to claim 14, wherein the controller controls the self-moving device to move toward the initial shadow region multiple times from a working region in different directions for exploration.

16. The self-moving device according to claim 14, further comprising:
an exploration starting position determining assembly, configured to generate an exploration starting position according to a position of the initial shadow region, wherein the controller is further configured to control the self-moving device to perform the exploration from the exploration starting position.

17. The self-moving device according to claim 14, wherein the controller is configured to recognize feature information of the corrected shadow region, determine an entering direction in which the self-moving device enters the corrected shadow region according to a feature of the corrected shadow region, and make the self-moving device enter the corrected shadow region in the entering direction.

18. The self-moving device according to claim 17, wherein the corrected shadow region comprises a first edge extending in an extending direction of a working region boundary, and the entering direction is a direction within a predetermined angle from a normal to the first edge.

19. The self-moving device according to claim 17, wherein the corrected shadow region comprises a first edge extending in an extending direction of a working region boundary, and the entering direction is within a predetermined angle from a direction parallel to the first edge.

\* \* \* \* \*